United States Patent
Son et al.

(10) Patent No.: US 9,984,479 B2
(45) Date of Patent: May 29, 2018

(54) DISPLAY APPARATUS FOR CAUSING A TACTILE SENSE IN A TOUCH AREA, AND DRIVING METHOD THEREOF

(71) Applicant: LG DISPLAY CO., LTD., Seoul (KR)

(72) Inventors: JiEun Son, Paju-si (KR); Yongkyun Choi, Paju-si (KR); SeungHwan Yoon, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 171 days.

(21) Appl. No.: 14/937,196

(22) Filed: Nov. 10, 2015

(65) Prior Publication Data

US 2016/0133034 A1    May 12, 2016

(30) Foreign Application Priority Data

Nov. 12, 2014    (KR) .................. 10-2014-0157324

(51) Int. Cl.
*G06T 11/20*    (2006.01)
*G06F 3/041*    (2006.01)
(Continued)

(52) U.S. Cl.
CPC .............. *G06T 11/20* (2013.01); *G06F 3/016* (2013.01); *G06F 3/044* (2013.01); *G06F 3/0416* (2013.01); *G06F 2203/04105* (2013.01)

(58) Field of Classification Search
CPC .......... G06F 3/016; G06F 2203/04105; G06F 3/041–3/047; G06T 11/20
See application file for complete search history.

(56) References Cited

U.S. PATENT DOCUMENTS

2010/0085169 A1    4/2010 Poupyrev et al.
2010/0231367 A1    9/2010 Cruz-Hernandez et al.
(Continued)

FOREIGN PATENT DOCUMENTS

CN    101907922 A    12/2010
CN    102054122 A    5/2011
(Continued)

OTHER PUBLICATIONS

Chinese (PRC) Intellectual Property Office Office Action dated Dec. 18, 2017 for Application 2015 10766136.8.

*Primary Examiner* — Larry Lee
(74) *Attorney, Agent, or Firm* — Dentons US LLP

(57) ABSTRACT

Disclosed are a method of modeling a haptic signal from a haptic object, a display apparatus, and a driving method thereof, which realize a tactile sense having a shape and texture of a haptic object. The method includes obtaining measurement data corresponding to a shape of a texture object while moving a sensor unit with respect to a haptic object including the texture object, obtaining force measurement data corresponding to a level of pressure applied to the haptic object, calculating shape modeling data and impulse modeling data corresponding to the texture object, based on the measurement data, calculating friction force modeling data corresponding to the texture object, based on the force measurement data, generating setting information of a haptic signal corresponding to the haptic object, based on the shape modeling data, the impulse modeling data, and the friction force modeling data, and storing the setting information of the haptic signal.

13 Claims, 16 Drawing Sheets

(51) Int. Cl.
*G06F 3/01* (2006.01)
*G06F 3/044* (2006.01)

(56) References Cited

U.S. PATENT DOCUMENTS

| | | |
|---|---|---|
| 2011/0267294 A1 | 11/2011 | Kildal |
| 2012/0327006 A1 | 12/2012 | Israr et al. |
| 2013/0181913 A1 | 7/2013 | Cole et al. |
| 2014/0062933 A1 | 3/2014 | Coulson et al. |
| 2014/0078102 A1* | 3/2014 | Araki .............. G06F 3/016 345/174 |
| 2014/0146005 A1* | 5/2014 | Hong .............. G06F 3/016 345/174 |
| 2014/0168105 A1* | 6/2014 | Zhou .............. G06F 3/016 345/173 |
| 2014/0267076 A1 | 9/2014 | Birnbaum et al. |
| 2015/0338921 A1 | 11/2015 | Birnbaum et al. |
| 2016/0085307 A1* | 3/2016 | Levesque .......... G06F 3/016 340/407.2 |

FOREIGN PATENT DOCUMENTS

| | | | |
|---|---|---|---|
| CN | 102099769 A | 6/2011 | |
| CN | 102349038 A | 2/2012 | |
| CN | 03869960 A | 6/2014 | |
| EP | 2354901 A1 | 8/2011 | |
| EP | 2728445 A2 | 5/2014 | |
| KR | 10-2014-0076794 A | 6/2014 | |
| KR | 20160000100 A * | 1/2016 | ............ G06F 3/041 |
| WO | 2009141502 A1 | 11/2009 | |

\* cited by examiner

DISPLAY APPARATUS FOR CAUSING A TACTILE SENSE IN A TOUCH AREA, AND DRIVING METHOD THEREOF

CROSS-REFERENCE TO RELATED APPLICATIONS

This application claims the benefit of the Korean Patent Application No. 10-2014-0157324 filed on Nov. 12, 2014, which is hereby incorporated by reference for all purposes as if fully set forth herein.

BACKGROUND

Field of the Invention

The present invention relates to a method of modeling a haptic signal from a haptic object and a display apparatus. More particularly, the present invention related to a method of modeling a haptic signal from a haptic object and a display apparatus, which realize a tactile sense having a shape and a texture of a haptic object.

Discussion of the Related Art

Touch panels are a type of input device that is included in display apparatuses such as liquid crystal display (LCD) apparatuses, field emission displays (FEDs), plasma display panels (PDPs), electroluminescent displays (ELDs), electrophoretic displays (EPDs), and organic light-emitting display apparatuses. Touch panels enable a user to input information by directly touching a screen with a finger, a pen or the like while looking at the screen of a display apparatus. Touch panels have been commercialized as input devices for portable information devices, such as smartphones, tablet personal computers (PCs), etc., and various electronic devices such as notebook computers, monitors, televisions (TVs), etc.

Touch panels are categorized into a resistive type, a capacitance type, an infrared type, etc. depending on a touch sensing method. Recently, since the capacitance type provides convenience in a manufacturing process and is good in touch sensitivity, the capacitance type is attracting much attention. Capacitive touch panels are categorized into a mutual capacitance type and a self-capacitance type. Mutual capacitive touch panels realize a multi-touch input, unlike self-capacitive touch panels.

Recently, haptic technology that applies an electrical tactile stimulus to a skin of a person by using an electric field (or a friction force) is being developed along with touch technology. Display apparatuses to which the haptic technology is applied apply a haptic signal to a haptic electrode to generate an attractive force for stimulating a tangoreceptor of a human body, and stimulate a tactile sense of a user by using the attractive force, thereby enabling the user to recognize a touch and a texture of the touch.

However, since display apparatuses to which conventional haptic technology is applied apply the same haptic signal to haptic objects having the same shape, haptic objects that have the same shape but have different materials cannot provide tactility of the materials to a user.

For example, FIGS. 1A and 1B are diagrams showing haptic signals respectively corresponding to haptic objects having different textures in a display apparatus to which conventional haptic technology is applied. FIG. 1A shows a haptic signal corresponding to a first haptic object 1 of a plastic material having a prism-pattern texture object 1a, and FIG. 1B shows a haptic signal corresponding to a second haptic object 2 of a rubber material having a prism-pattern texture object 2a.

As seen in FIGS. 1A and 1B, the display apparatus to which the conventional haptic technology is applied generates haptic signals respectively corresponding to shapes of the texture objects 1a and 2a irrespective of materials of the haptic objects 1 and 2 and provides tactility of the haptic objects 1 and 2 to a user. Therefore, the haptic objects 1 and 2 have different materials, but fingers of the user feel the same tactile sense from the haptic objects 1 and 2 that respectively have the texture objects 1a and 2 having the same shape.

For this reason, the display apparatus to which the conventional haptic technology is applied cannot realize a tactile sense having the same shape and texture as a texture object of a haptic object.

SUMMARY OF THE INVENTION

Accordingly, the present invention is directed to provide a method of modeling a haptic signal from a haptic object and a display apparatus that substantially obviate one or more problems due to limitations and disadvantages of the related art.

An aspect of the present invention is directed to provide a method of modeling a haptic signal from a haptic object, a display apparatus, and a driving method thereof, which realize a tactile sense having a shape and a texture of a haptic object.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a method of modeling a haptic signal from a haptic object including obtaining, through a sensor unit, measurement data corresponding to a shape of a texture object while moving the sensor unit with respect to a haptic object including the texture object, and obtaining, through a force sensor, force measurement data corresponding to a level of pressure applied to the haptic object, calculating shape modeling data and impulse modeling data corresponding to the texture object, based on the measurement data, calculating friction force modeling data corresponding to the texture object, based on the force measurement data, generating setting information of a haptic signal corresponding to the haptic object, based on the shape modeling data, the impulse modeling data, and the friction force modeling data, and storing the setting information of the haptic signal in a memory.

In another aspect of the present invention, there is provided a display apparatus including: a display panel including a plurality of pixels, a display driver driving the plurality of pixels, a touch panel disposed on the display panel, the touch panel including a plurality of transmission lines and a plurality of reception lines, a touch driver sensing a capacitance change of each of the plurality of reception lines to generate touch sensing data in a touch mode and in the haptic mode, generating a haptic signal to supply the haptic signal to at least one transmission line, and a controller generating image data based on image source data input thereto to supply the image data to the display driver, calculating a touch area based on the touch sensing data, and extracting haptic object data of a haptic object, corresponding to the touch area, from among pieces of haptic object data included in the image source data, wherein in the haptic mode, the touch driver generates the haptic signal that includes a carrier waveform and a haptic basic waveform corresponding to the haptic object data of the haptic object.

In another aspect of the present invention, there is provided a display apparatus including: a display panel including a plurality of pixels, a display driver driving the plurality of pixels, a touch panel disposed on the display panel, the touch panel including a plurality of transmission lines and a plurality of reception lines, a haptic panel disposed on the touch panel, the haptic panel including a haptic electrode layer, a touch driver sensing a capacitance change of each of the plurality of reception lines to generate touch sensing data, a haptic driver generating a haptic signal to supply the haptic signal to the haptic electrode layer, and a controller generating image data based on image source data input thereto to supply the image data to the display driver, calculating a touch area based on the touch sensing data, and extracting haptic object data of a haptic object, corresponding to the touch area, from among pieces of haptic object data included in the image source data, wherein the haptic driver generates the haptic signal that includes a carrier waveform and a haptic basic waveform corresponding to haptic object data of the haptic object, and supplies the haptic signal to the haptic electrode layer.

In another aspect of the present invention, there is provided a method of driving a display apparatus including: sensing a user touch applied to the touch panel to generate touch sensing data, calculating a touch area, based on the touch sensing data, extracting haptic object data of a haptic object, corresponding to the touch area, from among pieces of haptic object data included in input image source data, generating a haptic signal that includes a carrier waveform and a haptic basic waveform corresponding to haptic object data of the haptic object, and causing a tactile sense in the touch area by using the haptic signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Figure 1A:
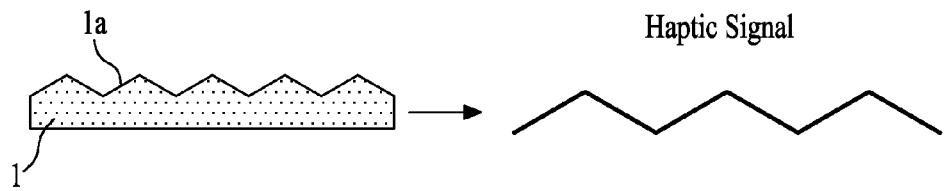
FIGS. 1A and 1B are diagrams showing haptic signals respectively corresponding to haptic objects having different textures in a display apparatus to which conventional haptic technology is applied.
Figure 1B:
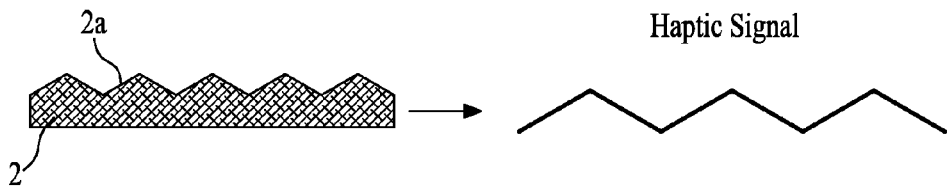

Reference will now be made in detail to the exemplary embodiments of the present invention, examples of which are illustrated in the accompanying drawings. Wherever possible, the same reference numbers will be used throughout the drawings to refer to the same or like parts.

The terms described in the specification should be understood as follows.

As used herein, the singular forms "a", "an" and "the" are intended to include the plural forms as well, unless the context clearly indicates otherwise. The terms "first" and "second" are for differentiating one element from the other element, and these elements should not be limited by these terms. It should be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. The term "on" should be construed as including a case where one element is formed at a top of another element and moreover a case where a third element is disposed therebetween.

Hereinafter, a method of modeling a haptic signal from a haptic object and a display apparatus using the same according to embodiments of the present invention will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present invention, the detailed description will be omitted.

Figure 2:
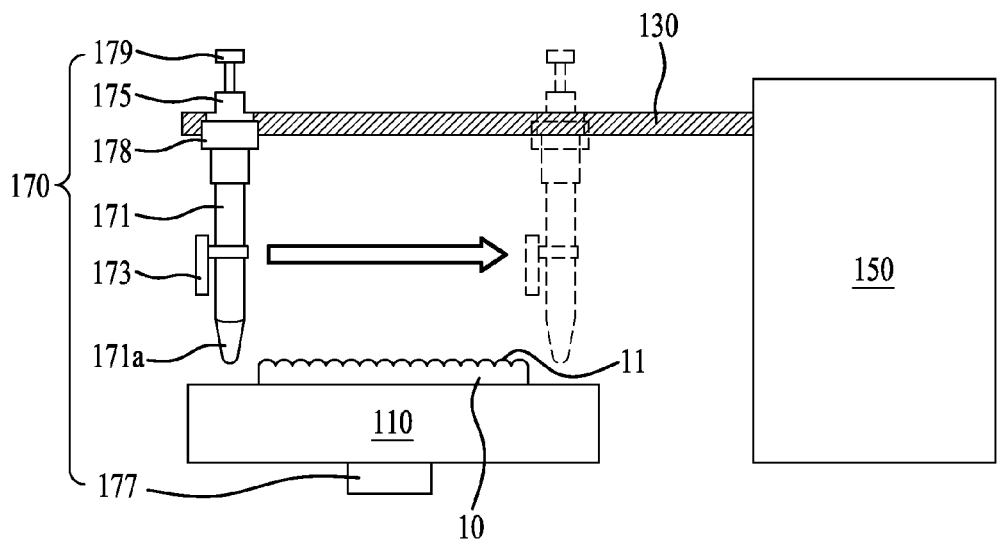
FIG. 2 is a diagram schematically illustrating an apparatus for modeling a haptic signal from a haptic object, according to an embodiment of the present invention.
Figure 2:
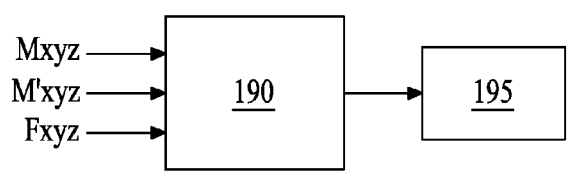

FIG. 2 is a diagram schematically illustrating an apparatus for modeling a haptic signal from a haptic object, according to an embodiment of the present invention.

Referring to FIG. 2, the apparatus for modeling a haptic signal from a haptic object according to an embodiment of the present invention may include a stage 110, a haptic object sample 10, a sensor transport plate 130, a plate transport unit 150, a sensor unit 170, and a haptic signal modeling unit 190.

The stage 110 may be disposed in a base frame (not shown) to support the haptic object sample 10.

A texture object 11 for stimulating a tactile sense of a user when a user touch is made may be provided on a surface of the haptic object sample 10. For example, the texture object 11 may include a smooth texture pattern or a rough texture pattern of the haptic object sample 10. The rough texture pattern may have a form of a regular or irregular geometric structure.

The sensor transport plate 130 may support the sensor unit 170 and may be transported in an X-axis or Y-axis direction according to driving of the plate transport unit 150, thereby transporting the sensor unit 170 in the X-axis or Y-axis direction.

The plate transport unit 150 may be disposed in the base frame to be adjacent to the stage 10 and may transport the sensor transport plate 130 in the X-axis or Y-axis direction, based on a finger sweep. The plate transport unit 150 according to an embodiment may convert a rotational motion of a motor into a rectilinear motion to transport the sensor transport plate 130 in the X-axis or Y-axis direction. The plate transport unit 150 may include an LM guider module that includes a guide rail and a guide block or may include a ball screw module that includes a ball screw, a ball nut, and a driving motor, but is not limited thereto.

The sensor unit 170 may measure an X-axis position, a Y-axis position, and a Z-axis position of the texture object 11 of the haptic object sample 10 to generate measurement data Mxyz including X-axis data, Y-axis data, and Z-axis data. The sensor unit 170 according to an embodiment may include a supporting pole 171, a 3-axis sensor 173, a linear bearing 175, a force sensor 177, and a 3-axis auxiliary sensor 178.

The supporting pole 171 may be disposed vertical to a top of the haptic object sample 10. A tip 171a that directly contacts the texture object 11 provided in the haptic object sample 10 may be disposed at a lower end of the supporting pole 171. Here, the tip 171a may have a diameter equal to a size of a user finger, and for example, may have a diameter of 10 mm to 20 mm.

The 3-axis sensor 173 may be disposed on the supporting pole 171 and may model the amount and shape of the texture object 11 provided in the haptic object sample 10. The 3-axis sensor 173 may generate the measurement data Mxyz including the X-axis data, the Y-axis data, and the Z-axis data based on a position change of the tip 171a that is brought in contact with the texture object 11 of the haptic object sample 10, and may supply the measurement data Mxyz to the haptic signal modeling unit 190. That is, the 3-axis sensor 173 may measure the position change of the tip 171a that is moved when the tip 171a is brought in contact with the texture object 11 of the haptic object sample 10 according to the plate transport unit 150 being transported. Such 3-axis data may be used as actual measurement simulation data for setting a haptic signal that simultaneously realizes a shape and a texture of the texture object 11 provided in the haptic object sample 10. The 3-axis sensor 173 according to an embodiment may be an acceleration sensor or a gyro sensor.

The linear bearing 175 may be disposed between the sensor transport plate 130 and the supporting pole 171 and may support the supporting pole 171 to be lowered and raised. A fine adjustment member 179 may be coupled to a top of the linear bearing 175. The fine adjustment member 179 may finely lower and raise the supporting pole 171 to finely adjust a position of the tip 171a that is brought in contact with the texture object 11 of the haptic object sample 10.

The force sensor 177 may be disposed on a bottom of the stage 110 and may model a friction force and a vertical drag based on a texture of the haptic object sample 10. The force sensor 177 may measure a level of pressure, which is applied to the haptic object sample 10 when the 3-axis sensor 173 performs sensing, to generate force measurement data Fxyz including X-axis data, Y-axis data, and Z-axis data and may supply the force measurement data Fxyz to the haptic signal modeling unit 190.

The 3-axis auxiliary sensor 178 may be disposed on the sensor transport plate 130 overlapping the linear bearing 175 to generate auxiliary measurement data M'xyz including X-axis data, Y-axis data, and Z-axis data based on a position change of the sensor transport plate 130 and may supply the auxiliary measurement data M'xyz to the haptic signal modeling unit 190. That is, the 3-axis auxiliary sensor 178 may measure the position change of the sensor transport plate 130 caused by transporting of the plate transport unit 150 to generate the auxiliary measurement data M'xyz. The auxiliary measurement data M'xyz may be used as noise removal data for removing a vibration noise that is applied to the 3-axis sensor 173 according to the sensor transport plate 130 being transported. The 3-axis auxiliary sensor 178 according to an embodiment may be a sensor that is the same as the 3-axis sensor 173.

The haptic signal modeling unit 190 may calculate shape modeling data and impulse modeling data corresponding to the texture object 11 by modeling a shape of the texture object 11 based on the measurement data Mxyz supplied from the 3-axis sensor 173. Also, the haptic signal modeling unit 190 may calculate friction force modeling data, vertical drag modeling data, and friction coefficient of the haptic object sample 10 by modeling a texture of the texture object 11 based on the force measurement data Fxyz supplied from the force sensor 177. Also, the haptic signal modeling unit 190 may generate haptic basic waveform information corresponding to the shape of the texture object 11 by performing a shape rendering operation based on the shape modeling data and the impulse modeling data and then may set a haptic voltage level of a haptic basic waveform and a frequency of a carrier waveform combined with the haptic basic waveform by performing a texture rendering operation based on the friction force modeling data. Here, a finger of a user may recognize a shape of the texture object 11 based on a low-frequency haptic signal, but cannot recognize a shape of the texture object 11 based on a high-frequency haptic signal. In the high-frequency haptic signal, the finger of the user may feel only a friction force. Therefore, the haptic basic waveform may have a frequency of 1 Hz to 100 Hz for realizing a shape and a texture of the texture object 11. Also, the frequency of the carrier waveform may be set to 1 kHz to 500 kHz for realizing a finer texture of the texture object 11, and for example, may be set to half (20 kHz/2) or more of a maximum audible frequency.

The haptic signal modeling unit 190 according to an embodiment may generate a first lookup table where setting information of a haptic signal, which includes haptic basic waveform information corresponding to a haptic basic waveform of the haptic object sample 10, a haptic voltage level of the haptic basic waveform, and frequency information of a carrier waveform combined with the haptic basic waveform, is mapped for each of a plurality of haptic object samples and may store the first lookup table in a memory 195. The first lookup table that is stored in the memory 195 by the haptic signal modeling unit 190 may be used as information for generating a haptic signal, which realizes the same shape and texture as those of a texture object of each haptic object sample, in an electronic device including a touch panel that senses only a position of a user touch.

The haptic signal modeling unit 190 according to another embodiment may generate a second lookup table where setting information of a haptic signal, which includes haptic basic waveform information corresponding to a haptic basic waveform of the haptic object sample 10 and a friction coefficient of the haptic object sample 10, is mapped for each of a plurality of haptic object samples and may store the second lookup table in the memory 195. The second lookup table that is stored in the memory 195 by the haptic signal modeling unit 190 may be used as information for generating a haptic signal, which realizes the same shape and texture as those of a texture object of each haptic object sample, in an electronic device including a touch panel that senses a touch force as well as a position of a user touch. In this case, the memory 195 may further store a third lookup table, where a correlation between friction forces of the haptic object sample 10 based on voltage levels is mapped, and a third lookup table where a correlation between friction forces of the haptic object sample 10 based on frequencies of carrier waveforms is mapped.

In addition, the haptic signal modeling unit 190 may correct the measurement data Mxyz supplied from the 3-axis sensor 173 by using the auxiliary measurement data M'xyz supplied from the 3-axis auxiliary sensor 178 and may generate the setting information of the haptic signal, based on the corrected measurement data Mxyz.

The apparatus for modeling a haptic signal from a haptic object according to an embodiment of the present invention may model the setting information of the haptic signal having the same shape and texture as those of the texture object 11 of the haptic object sample 10 by performing a shape modeling operation, a shape rendering operation, a texture modeling operation, and a texture rendering operation on the haptic object sample 10 including the texture object 11.

Figure 3:
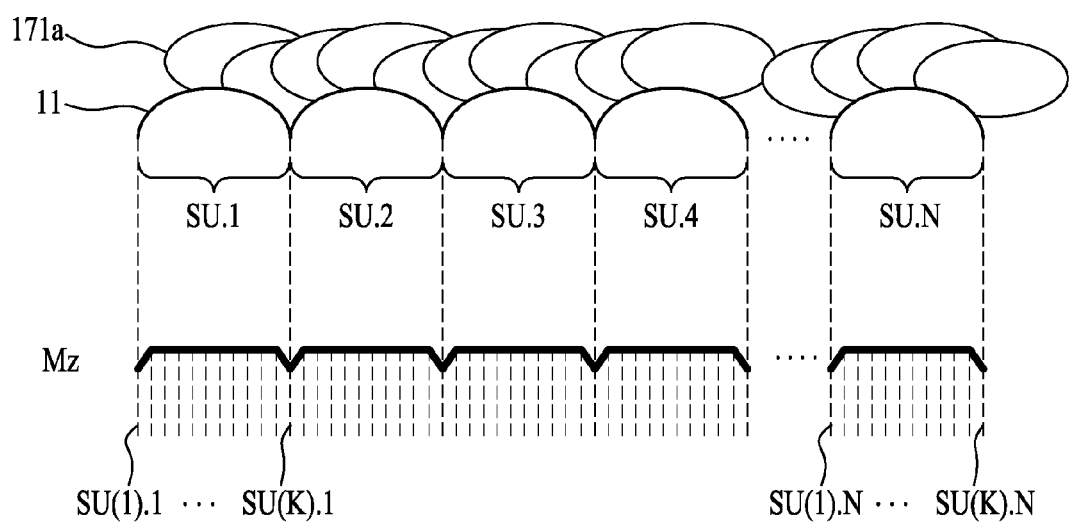
FIGS. 3 and 4 are diagrams describing a shape modeling method according to an embodiment of the present invention.
Figure 3:
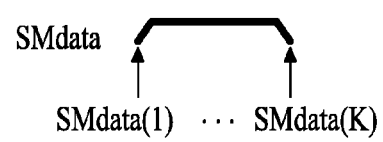
Figure 3:
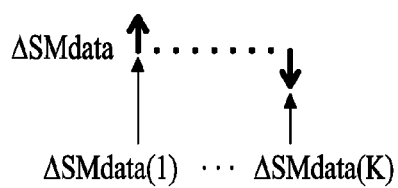
Figure 4:
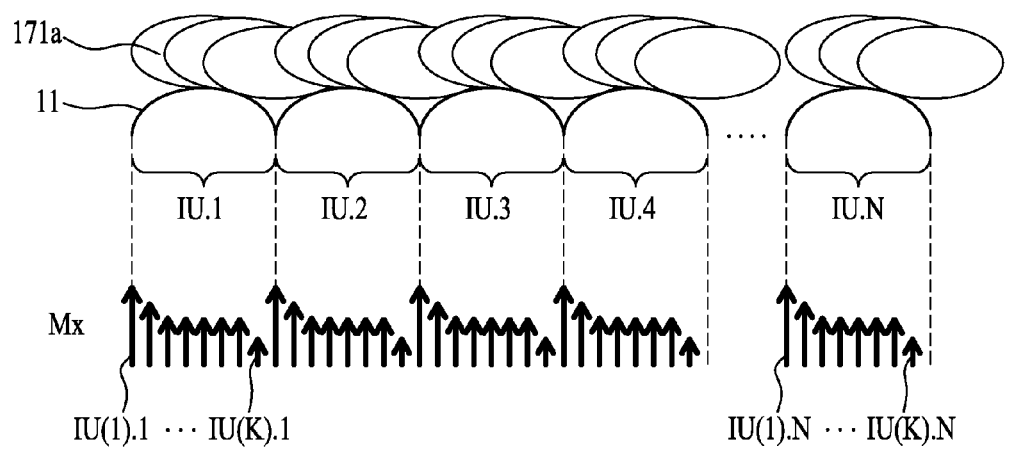
Figure 4:
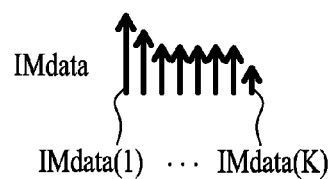
Figure 4:
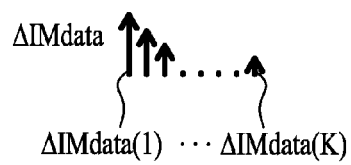

FIGS. 3 and 4 are diagrams describing a shape modeling method according to an embodiment of the present invention.

When a user touches and drags the haptic object sample 10, the shape modeling method according to an embodiment of the present invention may digitize the characteristic of the haptic object sample 10 recognized by a finger of the user and the amount of impact applied to the finger of the user.

Referring to FIGS. 2 and 3, the shape modeling method according to an embodiment may calculate shape modeling data SMdata corresponding to the texture object 11 by modeling a shape of the texture object 11, based on the Z-axis data Mz of the measurement data Mxyz supplied from the 3-axis sensor 173.

In detail, the texture object 11 of the haptic object sample 10 may be defined as first to Nth shape units SU.1 to SU.N which are grouped by a certain unit.

While moving according to the sensor transport plate 130 being transported, the 3-axis sensors 173 may measure a position change of the texture object 11 at first to Kth sensing times (SU(1).1 to SU(K).1) to (SU(1).N to SU(K).N), which are predetermined for the first to Nth shape units SU.1 to SU.N, to generate first to Kth measurement data Mxyz for each of the shape units and may supply the first to Kth measurement data Mxyz to the haptic signal modeling unit 190.

The haptic signal modeling unit 190 may calculate the shape modeling data SMdata corresponding to the texture object 11 of the haptic object sample 10, based on the Z-axis data Mz of the first to Kth measurement data Mxyz for each of the shape units SU.1 to SU.N. For example, the haptic signal modeling unit 190 may calculate the shape modeling data SMdata as expressed in the following Equation (1):

$$SMdata(k) = \frac{\sum_{n=1}^{N} SU(k) \cdot n}{N} \quad (1)$$

where k denotes natural numbers from one to K, and n denotes natural numbers from one to N.

The haptic signal modeling unit 190 may calculate, as shape modeling data SMdata(1) to SMdata(K) at a corresponding sensing time, an average value of pieces of Z-axis data Mz at the same sensing time for each of the shape units SU.1 to SU.N by using the Z-axis data Mz at the first to Kth sensing times (SU(1).1 to SU(K).1) to (SU(1).N to SU(K).N) for each of the first to Nth shape units SU.1 to SU.N, and may calculate the shape modeling data SMdata including the calculated shape modeling data SMdata(1) to SMdata(K) respectively corresponding to a plurality of sensing times, thereby digitizing (normalizing) a shape of the texture object 11 of the haptic object sample 10.

Moreover, as expressed in the following Equation (2), the haptic signal modeling unit 190 may calculate deviations "ΔMdata(1) to ΔMdata(K)" between the shape modeling data SMdata(1) to SMdata(K) respectively corresponding to the sensing times and shape modeling data 0 to SMdata(k−1) corresponding to a previous sensing time, based on the Z-axis data Mz of the first to Kth measurement data Mxyz for each of the shape units SU.1 to SU.N and may calculate shape modeling deviation data ΔSMdata including the calculated deviations "ΔSMdata(1) to ΔSMdata(K)" between the shape modeling data SMdata(1) to SMdata(K) respectively corresponding to the sensing times. Here, the shape modeling deviation data ΔSMdata may be applied for transferring strong tactility to the finger of the user according to a shape change of the texture object 11 when a finger sweep (or drag) of the user is performed for the texture object 11 of the haptic object sample 10:

$$\Delta SMdata(k) = \frac{\sum_{n=1}^{N} SU(k) \cdot n - SU(k-1) \cdot n}{N} \quad (2)$$

Referring to FIGS. 2 and 4, the shape modeling method according to an embodiment of the present invention may calculate impulse modeling data IMdata corresponding to the shape of the texture object 11 by modeling the amount of impact based on the X-axis data Mx of the measurement data Mxyz supplied from the 3-axis sensor 173.

In detail, the texture object 11 provided in the haptic object sample 10 may be defined as first to Nth impulse units IU.1 to IU.N which are grouped by a certain unit.

The haptic signal modeling unit 190 may calculate the impulse modeling data IMdata corresponding to the texture object 11 of the haptic object sample 10, based on the X-axis data Mx of the first to Kth measurement data Mxyz for each of the impulse units IU.1 to IU.N. For example, the haptic signal modeling unit 190 may calculate the impulse modeling data IMdata corresponding to the texture object 11 of the haptic object sample 10 as expressed in the following Equation (3):

$$IMdata(k) = \frac{\sum_{n=1}^{N} IU(k) \cdot n}{N} \quad (3)$$

The haptic signal modeling unit 190 may calculate, as impulse modeling data IMdata(1) to IMdata(K) at a corresponding sensing time, an average value of pieces of X-axis data Mx at the same sensing time for each of the impulse units IU.1 to IU.N by using the X-axis data Mx at the first to Kth sensing times (IU(1).1 to IU(K).1) to (IU(1).N to IU(K).N) for each of the first to Nth impulse units IU.1 to IU.N, and may calculate the impulse modeling data IMdata including the calculated impulse modeling data IMdata(1) to IMdata(K) respectively corresponding to a plurality of sensing times, thereby digitizing (normalizing) the amount of impact that is transferred to the finger of the user according to a shape change of the texture object 11 when the finger sweep (or drag) of the user is performed for the texture object 11 of the haptic object sample 10.

Moreover, as expressed in the following Equation (4), the haptic signal modeling unit 190 may calculate absolute deviations "ΔIMdata(1) to ΔIMdata(K)" between the impulse modeling data IMdata(1) to IMdata(K) respectively corresponding to the sensing times and impulse modeling data 0 to IMdata(k−1) corresponding to a previous sensing time, based on the X-axis data Mx of the first to Kth measurement data Mxyz for each of the shape units IU.1 to IU.N and may calculate impulse modeling deviation data ΔIMdata including the calculated absolute deviations "ΔIMdata(1) to ΔIMdata(K)" between the impulse modeling data IMdata(1) to IMdata(K) respectively corresponding to the sensing times. Here, the impulse modeling deviation data ΔIMdata may be applied for transferring strong tactility to the finger of the user according to a shape change of the texture object 11 when the finger sweep (or drag) of the user is performed for the texture object 11 of the haptic object sample 10:

$$\Delta IMdata(k) = \frac{\sum_{n=1}^{N} IU(k) \cdot n - IU(k-1) \cdot n}{N} \quad (4)$$

Figure 5A:
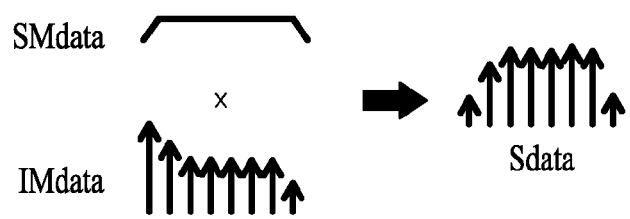
FIGS. 5A, 5B and 5C are diagrams describing a shape rendering method according to an embodiment of the present invention.
Figure 5B:
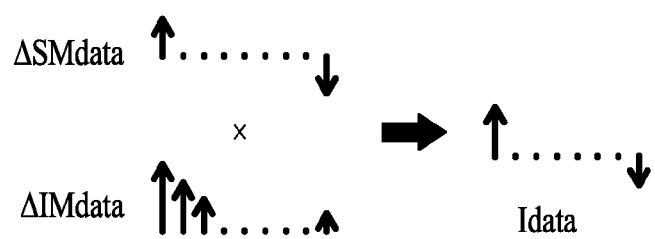
Figure 5C:
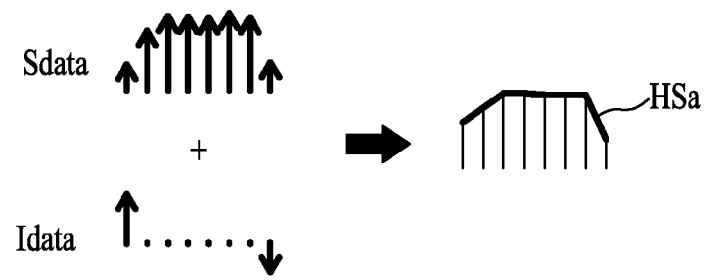

FIGS. 5A, 5B and 5C are diagrams describing a shape rendering method according to an embodiment of the present invention.

When a user touches and drags the texture object 11 of the haptic object sample 10, the shape rendering method according to an embodiment of the present invention may generate a haptic basic waveform HSa corresponding to the amount of impact and shape of the texture object 11 recognized by a finger of the user, based on data calculated through the above-described shape modeling.

Referring to FIG. 5A, the shape rendering method according to an embodiment of the present invention may calculate shape data Sdata corresponding to a shape of the texture object 11. In FIG. 5B, based on the shape modeling data SMdata and the impulse modeling data IMdata calculated through the above-described shape modeling, the shape rendering method may calculate impulse data Idata. In FIG. 5C, based on the shape modeling deviation data ΔSMdata and the impulse modeling deviation data ΔIMdata, the method may generate the haptic basic waveform HSa, based on the calculated shape data Sdata and impulse data Idata, and may generate haptic basic waveform information corresponding to the haptic basic waveform HSa.

In detail, the haptic signal modeling unit 190 may calculate the shape data Sdata by multiplying the shape modeling data SMdata and the impulse modeling data IMdata corresponding to the same sensing time. The haptic signal modeling unit 190 may calculate the impulse data Idata by multiplying the shape modeling deviation data ΔSMdata and the impulse modeling deviation data ΔIMdata corresponding to the same sensing time. Also, the haptic signal modeling unit 190 may generate the haptic basic waveform HSa by summating the shape data Sdata and the impulse data Idata corresponding to the same sensing time.

Figure 6:
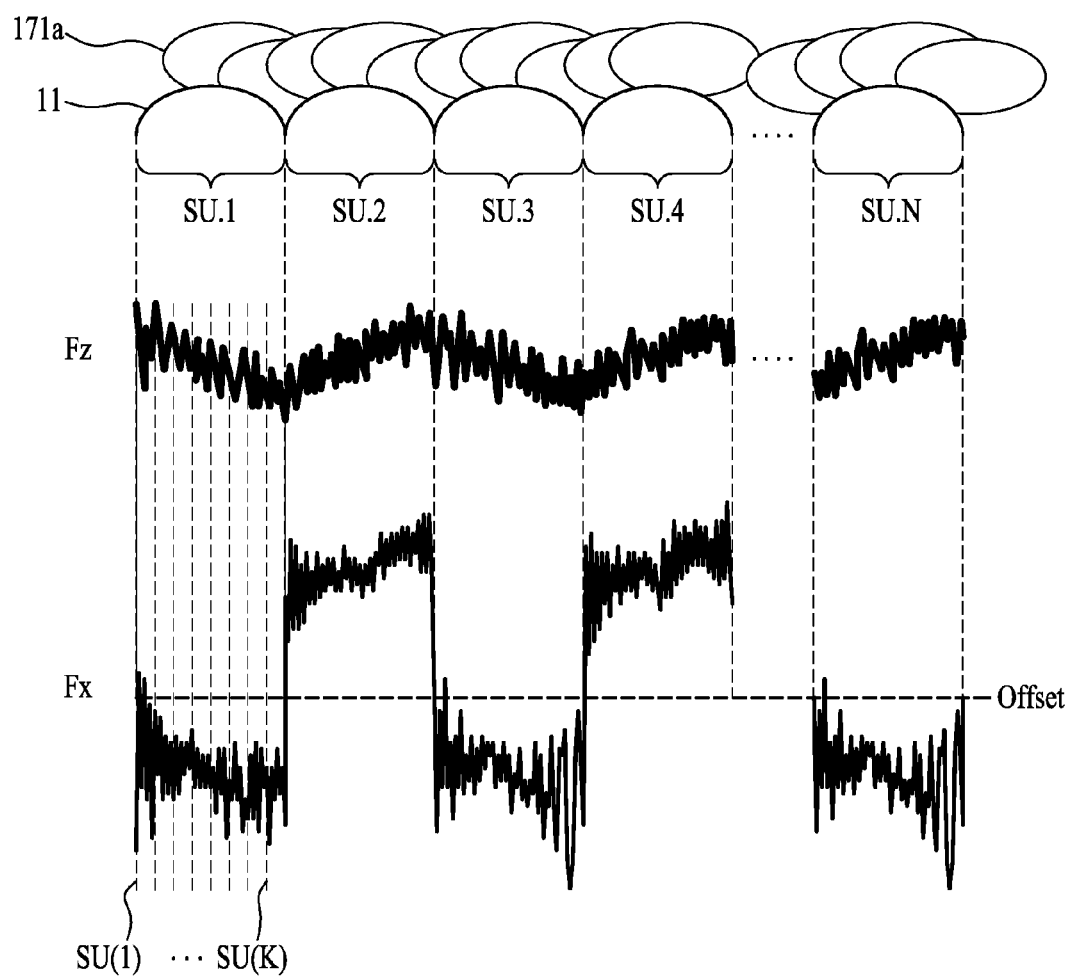
FIG. 6 is a diagram describing a texture modeling method according to an embodiment of the present invention.

FIG. 6 is a diagram describing a texture modeling method according to an embodiment of the present invention.

When a user touches and drags the haptic object sample 10, the texture modeling method according to an embodiment of the present invention may model a vertical drag and a friction force, which are generated on a finger of the user, based on a material of the haptic object sample 10 to calculate friction force modeling data, vertical drag modeling data, and friction coefficient of the haptic object sample 10.

Referring to FIG. 6, the texture modeling method according to an embodiment of the present invention may calculate the vertical drag modeling data corresponding to the material of the haptic object sample 10, based on the Z-axis data Fz of the force measurement data Fxyz supplied from the force sensor 173 and may calculate the friction force modeling data corresponding to the material of the haptic object sample 10, based on the X-axis data Fx of the force measurement data Fxyz.

In detail, the force sensor 173 may measure forces, which are applied to the haptic object sample 10 at the first to Kth sensing times SU(1) to SU(K) which are predetermined for the first to Nth shape units SU.1 to SU.N, to generate first to Kth force measurement data Fxyz for each of the shape units SU.1 to SU.N and may supply the first to Kth force measurement data Fxyz to the haptic signal modeling unit 190.

The haptic signal modeling unit 190 may calculate vertical drag modeling data "$F_{Normal}$", based on the Z-axis data Fz of the first to Kth force measurement data Fxyz for each of the shape units SU.1 to SU.N. For example, the haptic signal modeling unit 190 may calculate the vertical drag modeling data "$F_{Normal}$" as expressed in the following Equation (5). That is, the haptic signal modeling unit 190 may summate the Z-axis data Fz of the first to Kth force measurement data Fxyz in units of the shape units SU.1 to SU.N to calculate an absolute average value "SU.(n)" and then may subtract the absolute average value "SU.(n)" of each of the shape units SU.1 to SU.N from the total number of shape units to calculate the vertical drag modeling data "$F_{Normal}$":

$$SU \cdot (n) = \frac{\sum_{k=1}^{K} |SU(k)|}{K} \quad (5)$$

$$F_{Normal} = \frac{\sum_{n=1}^{N} SU \cdot (n)}{N}$$

where k denotes natural numbers from one to K, N denotes the total number of shape units, and n denotes natural numbers from one to N.

The haptic signal modeling unit 190 may calculate friction force modeling data "$F_{Friction}$" based on the X-axis data Fx of the first to Kth force measurement data Fxyz for each of the shape units SU.1 to SU.N. For example, the haptic signal modeling unit 190 may calculate the friction force modeling data "$F_{Friction}$" as expressed in the following Equation (6). That is, the haptic signal modeling unit 190 may summate the X-axis data Fx of the first to Kth force measurement data Fxyz in units of the shape units SU.1 to SU.N to calculate an absolute value of the average value "SU.(n)" and then may subtract the absolute average value "SU.(n)" of each of the shape units SU.1 to SU.N from the total number "N" of shape units to calculate the friction force modeling data "$F_{Friction}$". In this case, the first to Kth force measurement data Fxyz may have a positive (+) value or a negative (−) value according to a force direction, and the haptic signal modeling unit 190 may apply an offset value "Offset" in order for the first to Kth force measurement data Fxyz to have a positive (+) value or a negative (−) value with respect to zero. In this case, the haptic signal modeling unit 190 may subtract the offset value from each of the X-axis data Fx of the first to Kth force measurement data Fxyz and may summate the X-axis data Fx of the first to Kth force measurement data Fxyz, from which the offset value has been subtracted, to calculate the absolute average value "SU.(n)":

$$SU \cdot (n) = \frac{\sum_{k=1}^{K} |SU(k) - \text{Offset}|}{K} \quad (6)$$

$$F_{Friction} = \frac{\sum_{n=1}^{N} SU \cdot (n)}{N}$$

The haptic signal modeling unit 190 may divide the vertical drag modeling data "$F_{Normal}$" by the friction force modeling data "$F_{Friction}$" to calculate a friction coefficient "μ" of the haptic object sample 10 as expressed in the following Equation (7):

$$F_{Friction} = \mu \times F_{Normal} \quad (7)$$

$$\mu = \frac{F_{Friction}}{F_{Normal}}$$

Figure 7:
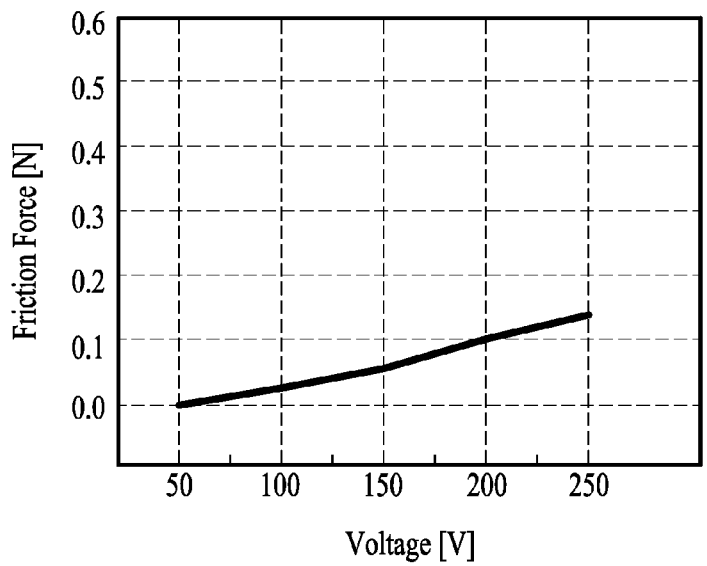
FIG. 7 is a graph showing a correlation between a voltage level and a friction force in a texture rendering method according to an embodiment of the present invention.

FIG. 7 is a graph showing a correlation between a voltage level and a friction force in a texture rendering method according to an embodiment of the present invention.

When a user touches and drags the haptic object sample 10, in order to realize a vibration corresponding to the texture object 11 of the haptic object sample 10 recognized by a finger of the user, the texture rendering method according to an embodiment of the present invention may collect friction forces of the haptic object sample 10 based on voltage levels through pre-experiment and may generate a third lookup table where a correlation between the collected friction forces based on the voltage levels is mapped, based on the haptic basic waveform generated through the above-described shape rendering.

The haptic signal modeling unit 190 may extract a voltage level based on friction force modeling data "$F_{Friction}$" of the haptic object sample 10 calculated through the above-described texture modeling by using the third lookup table and may set the extracted voltage level as a haptic voltage level.

In addition, the third lookup table may be stored in the memory 195. In this case, an electronic device that includes a touch panel for sensing a touch force as well as a touch position of a user touch may sense a touch force when there is a user touch, may calculate a vertical drag from the sensed touch force, may calculate a friction force by performing an arithmetic operation on the calculated vertical drag and the friction coefficient, and may extract a voltage level based on the friction force by using the third lookup table stored in the memory 195, and may set the extracted voltage level as the haptic voltage level.

Figure 8:
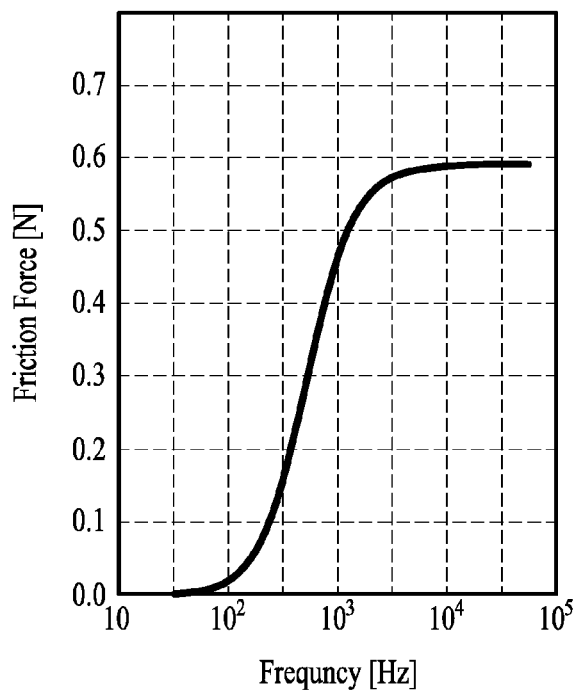
FIG. 8 is a graph showing a correlation between a frequency of a carrier waveform and a friction force in a texture rendering method according to an embodiment of the present invention.

FIG. 8 is a graph showing a correlation between a frequency of a carrier waveform and a friction force in a texture rendering method according to an embodiment of the present invention.

When a user touches and drags the haptic object sample 10, in order to realize a friction force corresponding to the texture object 11 of the haptic object sample 10 recognized by a finger of the user based on the haptic basic waveform generated through the above-described shape rendering, the texture rendering method according to an embodiment of the present invention may collect friction forces of the haptic object sample 10 based on frequencies of carrier waveforms through pre-experiment and may generate a fourth lookup table where a correlation between the collected friction forces of the haptic object sample 10 based on the frequencies of the carrier waveforms is mapped.

The haptic signal modeling unit 190 according to an embodiment may calculate a frequency based on the friction force modeling data "$F_{Friction}$" of the haptic object sample 10 calculated through the above-described texture modeling by using the fourth lookup table and may set the extracted frequency as frequency information of a carrier waveform combined with a haptic basic waveform.

In addition, the fourth lookup table may be stored in the memory 195. In this case, the electronic device that includes the touch panel for sensing a touch force as well as a touch position of a user touch may sense a touch force when there is a user touch, may calculate a vertical drag from the sensed touch force, may calculate a friction force by performing an arithmetic operation on the calculated vertical drag and the friction coefficient, and may extract a frequency based on the friction force by using the fourth lookup table stored in the memory 195, and may set the extracted frequency as the frequency information of the carrier waveform combined with the haptic basic waveform.

Figure 9:
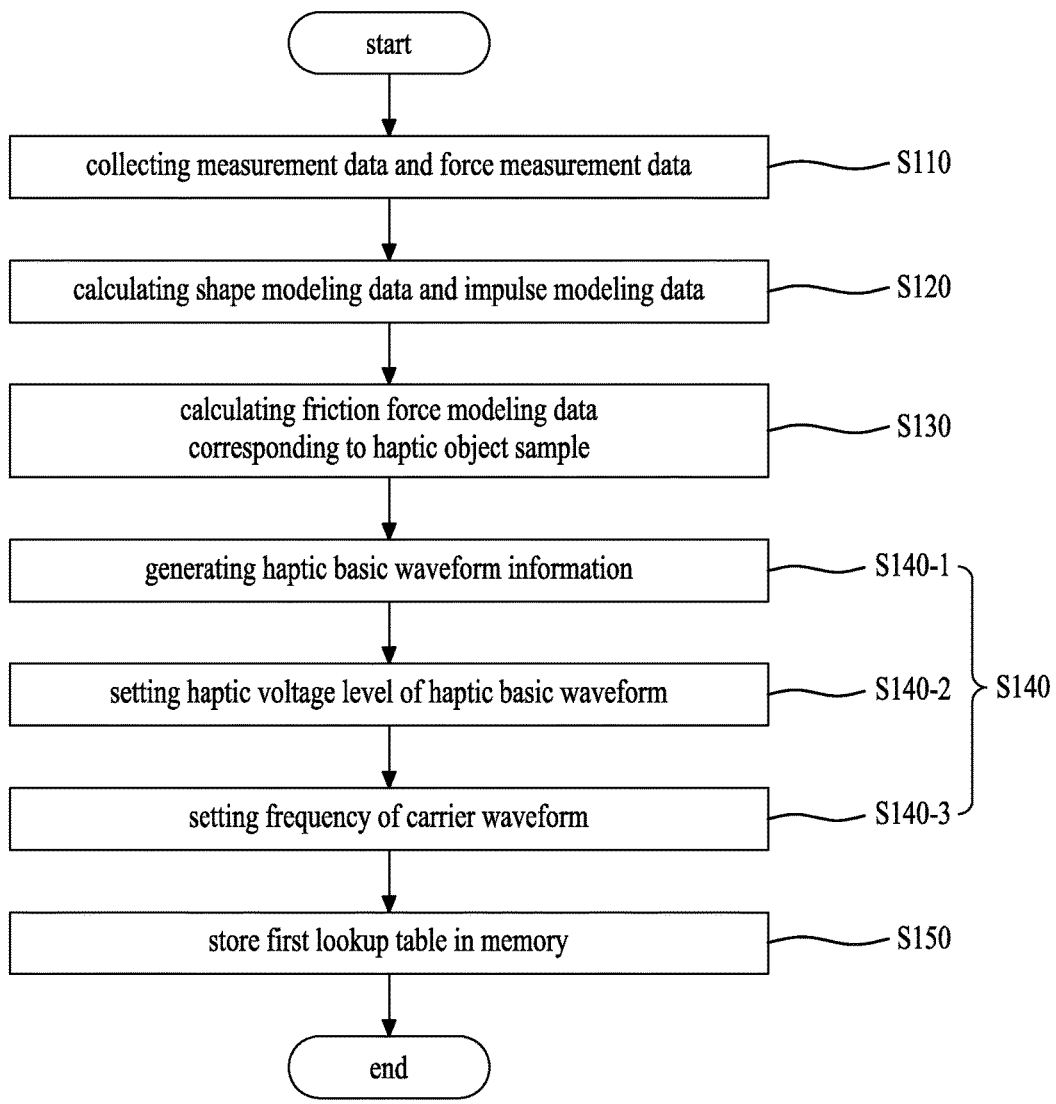
FIG. 9 is a flowchart describing a method of modeling a haptic signal from a haptic object, according to an embodiment of the present invention.

FIG. 9 is a flowchart describing a method of modeling a haptic signal from a haptic object, according to an embodiment of the present invention.

A method of modeling a haptic signal from a haptic object according to an embodiment of the present invention will be described below with reference to FIGS. 2 to 9. Hereinafter, in describing the method of modeling a haptic signal from a haptic object, details which are the same as those of the apparatus for modeling a haptic signal from a haptic object are not repeated.

First, the haptic object sample 10 including the texture object 11 may be located on the stage 10, and then, the sensor transport plate 130 may be transported according to driving of the plate transport unit 150.

Subsequently, in operation S110, measurement data Mxyz of the texture object 11 measured by the 3-axis sensor 173 and force measurement data Fxyz measured by the force sensor 177 may be collected according to transporting of the sensor transport plate 130.

Subsequently, in operation S120, shape modeling data SMdata corresponding to the texture object 11 of the haptic object sample 10 may be calculated by executing Equation (1) based on Z-axis data of the measurement data Mxyz, and impulse modeling data IMdata corresponding to the texture object 11 of the haptic object sample 10 may be calculated by executing Equation (3) based on X-axis data of the measurement data Mxyz.

Subsequently, in operation S130, friction force modeling data "$F_{Friction}$" corresponding to the haptic object sample 10 may be calculated based on X-axis data Fx of the force measurement data Fxyz. Here, the friction force modeling data "$F_{Friction}$" may be calculated by executing Equation (6) based on the force measurement data Fxyz, and its repetitive description is not repeated.

Subsequently, in operation S140, setting information of the haptic signal based on the shape modeling data SMdata, the impulse modeling data IMdata, and the friction force modeling data "$F_{Friction}$" may be generated. Here, the setting information of the haptic signal may include haptic basic waveform information of the texture object 11 of the haptic object sample 10, the haptic voltage level, and frequency information of a carrier waveform combined with the haptic basic waveform.

Subsequently, in operation S150, a first lookup table may be generated by mapping the setting information of the haptic signal to the haptic object sample 10 and may be stored in the memory 195. Here, the memory 195 storing the first lookup table may be equipped in an electronic device that includes a touch panel for sensing only a touch position of a user touch.

Hereinafter, operation S140 of generating the setting information of the haptic signal will be described in more detail.

First, in operation S140-1, haptic basic waveform information based on the shape modeling data SMdata and the impulse modeling data IMdata may be generated. For example, operation S140-1 may include: an operation of calculating shape modeling deviation data ΔSMdata by executing Equation (2) based on the shape modeling data SMdata and calculating impulse modeling deviation data ΔIMdata by executing Equation (4) based on the impulse modeling data IMdata; an operation of calculating shape data Sdata by multiplying the shape modeling data SMdata and the impulse modeling data IMdata corresponding to the same sensing time; an operation of calculating impulse data Idata by multiplying the shape modeling deviation data ΔSMdata and the impulse modeling deviation data ΔIMdata corresponding to the same sensing time; an operation of generating a haptic basic waveform HSa by summating the shape data Sdata and the impulse data Idata corresponding to the same sensing time; and an operation of generating the haptic basic waveform information corresponding to the haptic basic waveform HSa.

Subsequently, in operation S140-2, a voltage level based on friction force modeling data "$F_{Friction}$" of the haptic object sample 10 may be extracted from a third lookup table where a correlation between friction forces of the haptic object sample based on voltage levels is mapped, and the extracted voltage level may be set as a haptic voltage level of the haptic basic waveform HSa.

Subsequently, in operation S140-3, a frequency based on the friction force modeling data "$F_{Friction}$" may be extracted from a fourth lookup table where a correlation between friction forces of the haptic object sample based on frequency information of carrier waveforms is mapped, and the extracted frequency may be set as the frequency information of the carrier waveforms.

The method of modeling a haptic signal from a haptic object according to an embodiment of the present invention may model setting information of a haptic signal for providing a user with a texture as well as a shape of a haptic object sample.

Figure 10:
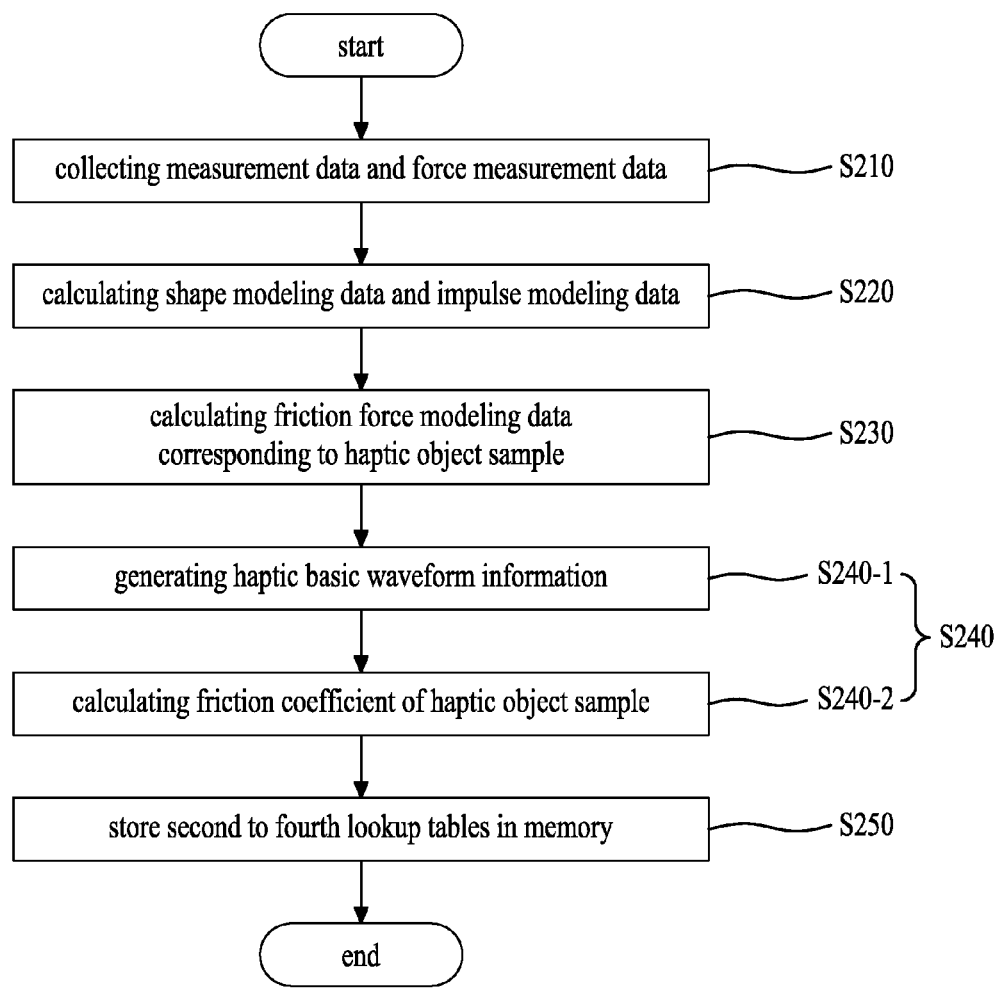
FIG. 10 is a flowchart describing a method of modeling a haptic signal from a haptic object, according to another embodiment of the present invention.

FIG. 10 is a flowchart for describing a method of modeling a haptic signal from a haptic object, according to another embodiment of the present invention.

A method of modeling a haptic signal from a haptic object according to another embodiment of the present invention will be described below with reference to FIGS. 2 to 9 and 10. Hereinafter, in describing the method of modeling a haptic signal from a haptic object, details which are the same as those of the apparatus for modeling a haptic signal from a haptic object are not repeated.

First, the haptic object sample 10 including the texture object 11 may be located on the stage 10, and then, the sensor transport plate 130 may be transported according to driving of the plate transport unit 150.

Subsequently, in operation S210, measurement data Mxyz of the texture object 11 measured by the 3-axis sensor 173 and force measurement data Fxyz measured by the force sensor 177 may be collected according to transporting of the sensor transport plate 130.

Subsequently, in operation S220, shape modeling data SMdata corresponding to the texture object 11 of the haptic object sample 10 may be calculated by executing Equation (1) based on Z-axis data of the measurement data Mxyz, and impulse modeling data IMdata corresponding to the texture object 11 of the haptic object sample 10 may be calculated by executing Equation (3) based on X-axis data of the measurement data Mxyz.

Subsequently, in operation S230, friction force modeling data "$F_{Friction}$" corresponding to the haptic object sample 10 may be calculated based on X-axis data Fx of the force measurement data Fxyz. Here, the friction force modeling data "$F_{Friction}$" may be calculated by executing Equation (6) based on the force measurement data Fxyz, and its repetitive description is not repeated.

Subsequently, in operation S240, setting information of the haptic signal based on the shape modeling data SMdata, the impulse modeling data IMdata, the force measurement data Fxyz, and the friction force modeling data "$F_{Friction}$" may be generated. Here, the setting information of the haptic signal may include haptic basic waveform information of the texture object 11 of the haptic object sample 10 and a friction coefficient "μ" of the haptic object sample 10.

Subsequently, in operation S250, a second lookup table may be generated by mapping the setting information of the haptic signal to the haptic object sample 10 and may be stored in the memory 195, and a third lookup table where a correlation between friction forces of the haptic object sample 10 based on voltage levels and a fourth lookup table where a correlation between friction forces of the haptic object sample 10 based on frequencies of carrier waveforms may be additionally stored in the memory 195. Here, the memory 195 storing the second to fourth lookup tables may be equipped in an electronic device that includes a touch panel for sensing a touch force as well as a touch position of a user touch.

Hereinafter, operation S240 of generating the setting information of the haptic signal will be described in more detail.

First, in operation S240-1, haptic basic waveform information based on the shape modeling data SMdata and the impulse modeling data IMdata may be generated. For example, operation S240-1 may include: an operation of calculating shape modeling deviation data ΔSMdata by executing Equation (2) based on the shape modeling data SMdata and calculating impulse modeling deviation data ΔIMdata by executing Equation (4) based on the impulse modeling data IMdata; an operation of calculating shape data Sdata by multiplying the shape modeling data SMdata and the impulse modeling data IMdata corresponding to the same sensing time; an operation of calculating impulse data Idata by multiplying the shape modeling deviation data ΔSMdata and the impulse modeling deviation data ΔIMdata corresponding to the same sensing time; an operation of generating a haptic basic waveform HSa by summating the shape data Sdata and the impulse data Idata corresponding to the same sensing time; and an operation of generating the haptic basic waveform information corresponding to the haptic basic waveform HSa.

Subsequently, in operation S240-2, the friction coefficient "μ" of the haptic object sample 10 may be calculated based on the force measurement data Fxyz and the friction force modeling data "$F_{Friction}$". For example, operation S240-2 may include: an operation of calculating vertical drag modeling data "$F_{Normal}$" by executing Equation (5) based on Z-axis data of the force measurement data Fxyz; and an operation of calculating the friction coefficient "μ" by executing Equation (7) based on the vertical drag modeling data "$F_{Normal}$" and the friction force modeling data "$F_{Friction}$".

The method of modeling a haptic signal from a haptic object according to another embodiment of the present invention may model setting information of a haptic signal for simultaneously realizing a texture and a shape of a haptic object sample.

The apparatus and method for modeling a haptic signal from a haptic object may generate, through a modeling method and a rendering method, a lookup table where setting information of a haptic signal, which includes haptic basic waveform information of each of a plurality of haptic object samples, a haptic voltage level of a haptic basic waveform, and frequency information of a carrier waveform, is mapped for each of various haptic object samples 10 and may store the first lookup table in a memory, thereby building a database of the setting information of the haptic signal for simultaneously realizing a shape and a texture of a haptic object for each haptic object sample.

Figure 11:
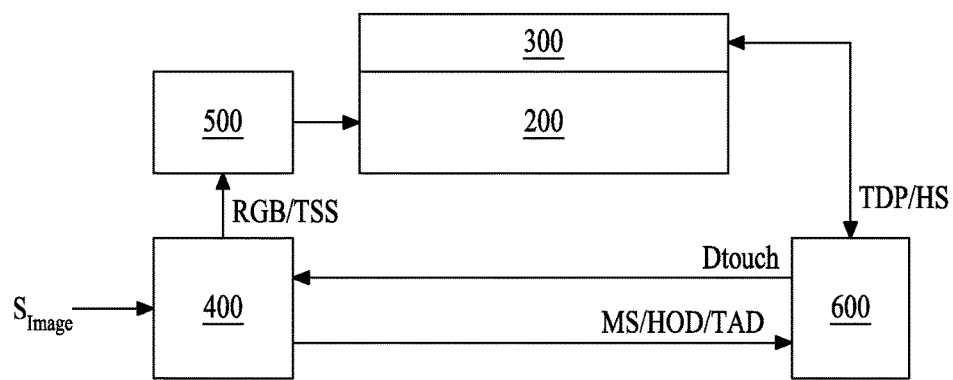
FIG. 11 is a block diagram schematically illustrating a display apparatus according to a first embodiment of the present invention.
Figure 12:
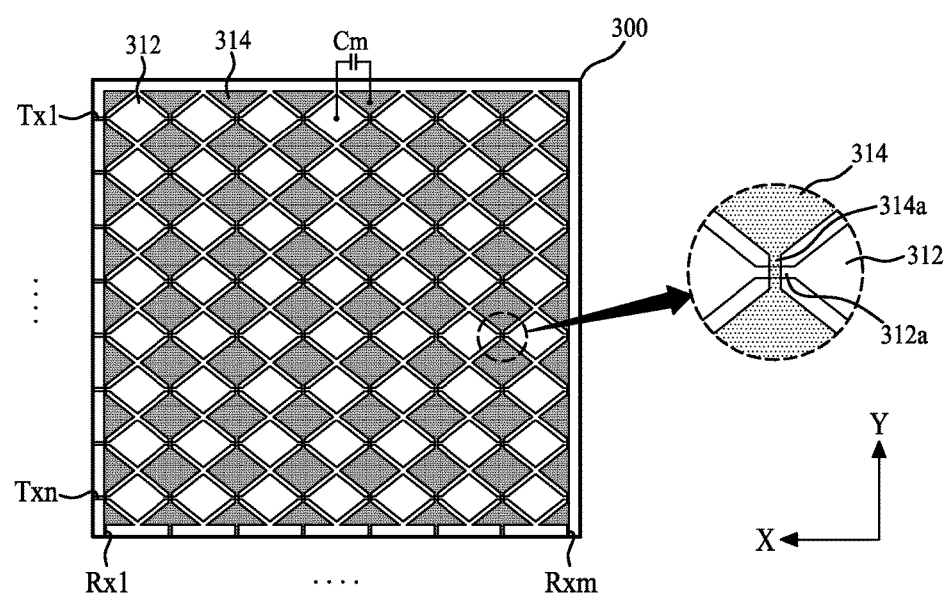
FIG. 12 is a diagram schematically illustrating an electrode structure of a touch panel illustrated in FIG. 11.
Figure 13:
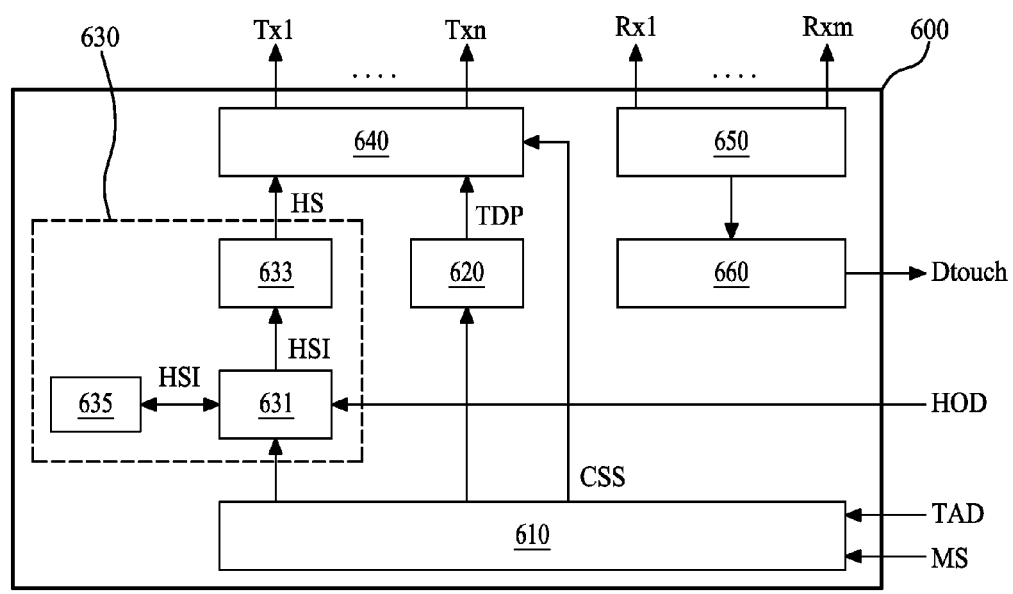
FIG. 13 is a block diagram describing a touch driver illustrated in FIG. 11.

FIG. 11 is a block diagram schematically illustrating a display apparatus according to a first embodiment of the present invention. FIG. 12 is a diagram schematically illustrating an electrode structure of a touch panel illustrated in FIG. 11. FIG. 13 is a block diagram for describing a touch driver illustrated in FIG. 11.

Referring to FIGS. 11 to 13, the display apparatus according to the first embodiment of the present invention may include a display panel 200, a touch panel 300, a controller 400, a display driver 500, and a touch driver 600.

The display panel 200 may include a plurality of pixels which are respectively provided in a plurality of pixel areas defined by a plurality of gate lines and a plurality of data lines. Each of the plurality of pixels may display a certain image in response to a signal supplied from the display driver 500. The display panel 200 including the plurality of pixels may be a liquid crystal display panel or an organic light emitting display panel known to those skilled in the art, and thus, its detailed description is not provided.

The touch panel 300 may include a plurality of transmission lines Tx1 to Txn and a plurality of reception lines Rx1 to Rxm.

The plurality of transmission lines Tx1 to Txn may be arranged in parallel at predetermined intervals along a first direction Y in the touch panel 300. Each of the plurality of transmission lines Tx1 to Txn may include a plurality of touch driving electrodes 312, which are arranged at predetermined intervals along a second direction X intersecting the first direction Y, and a plurality of first bridges 312a that each connect adjacent touch driving electrodes 312 among the plurality of touch driving electrodes 312. Here, each of the touch driving electrodes 312 may have a plane having a polygonal shape, for example, a diamond shape. Each of the plurality of first bridges 312a may connect adjacent touch driving electrodes 312. Each of the plurality of transmission lines Tx1 to Txn may be separately connected to the touch driver 600 and may be used as a haptic electrode that generates an attractive force according to a haptic signal to provide tactility to a finger of a user.

The plurality of reception lines Rx1 to Rxm may be arranged in parallel at predetermined intervals along the second direction X in the touch panel 300. Each of the plurality of reception lines Rx1 to Rxm may include a plurality of touch sensing electrodes 314, which are arranged at predetermined intervals along the first direction Y, and a plurality of second bridges 314a that each connect adjacent touch sensing electrodes 314 among the plurality of touch sensing electrodes 314. Each of the touch sensing electrodes 314 may have a plane which is the same as that of the touch driving electrodes 312, and may be disposed between the touch driving electrodes 312. Therefore, the plurality of touch driving electrodes 312 and the plurality of touch sensing electrodes 314 may be disposed in a check shape. Each of the second bridges 314a may be provided to intersect a corresponding first bridge 312a to electrically connect adjacent touch sensing electrodes 314. Each of the plurality of reception lines Rx1 to Rxm may be separately connected to the touch driver 600 and may be used as a haptic electrode that generates an attractive force according to the haptic signal to provide tactility to a finger of a user.

The plurality of transmission lines Tx1 to Txn and the plurality of reception lines Rx1 to Rxm may be provided to intersect each other with an insulating layer (or a dielectric layer) therebetween. Therefore, the insulating layer may generate a mutual capacitance Cm between the touch driving electrode 312 and the touch sensing electrode 314 adjacent thereto. The mutual capacitance Cm may act as a touch sensor that senses a user touch applied to the touch panel 300.

It has been described that each of the plurality of transmission lines Tx1 to Txn includes the diamond-shaped electrode 321 and each of the plurality of reception lines Rx1 to Rxm includes the diamond-shaped electrode 314, but the present embodiment is not limited thereto. In other embodiments, the plurality of transmission lines Tx1 to Txn may be provided in a bar shape without including the electrodes 312, and the plurality of reception lines Rx1 to Rxm may be provided in a bar shape without including the electrodes 314. Furthermore, the touch panel 300 may have a structure of a mutual capacitive touch panel known to those skilled in the art.

The touch panel 300 may be disposed on or directly attached to a top of the display panel 200. For example, when the display panel 200 is a liquid crystal display panel (or an organic light emitting display panel) including an upper polarizing film (not shown), the touch panel 300 may be disposed on the upper polarizing film or may be disposed between an upper substrate (not shown) and the upper polarizing film.

The controller 400 may generate frame-unit image data RGB and a timing synchronization signal TSS, based on image source data "$S_{Image}$" input from the outside and may supply the image data RGB and the timing synchronization signal TSS to the display driver 500.

The controller 400 may calculate touch area data TAD corresponding to a user touch area, based on touch sensing data Dtouch supplied from the touch driver 600 and may execute an application program associated with the calculated touch area data TAD.

Moreover, the controller 400 may extract haptic object data HOD from the image source data "$S_{Image}$", based on the touch area data TAD and may supply the extracted haptic object data HOD to the touch driver 600. Here, the image source data "$S_{Image}$" of one frame may include image data, corresponding to a frame image displayed by the display panel 200, and the haptic object data HOD corresponding to a haptic object included in the frame image. Therefore, the controller 400 may extract haptic object data HOD of the user touch area, corresponding to the touch area data TAD, from the haptic object data HOD included in the frame-unit image source data "$S_{Image}$" and may supply the extracted haptic object data HOD to the touch driver 600.

The display driver 500 may supply data signals respectively corresponding to the image data RGB to the respective pixels by using the image data RGB and the timing synchronization signal TSS which are supplied from the controller 400, thereby displaying a certain image in the display panel 200. For example, the display driver 500 may include: a timing controller (not shown) that generates a gate control signal and a data control signal by using the timing synchronization signal TSS supplied from the controller 400 and aligns the image data RGB to generate pixel data; a gate driving circuit unit that generates a gate signal according to the gate control signal and sequentially supplies the gate signal to the plurality of gate lines; and a data driving circuit unit (not shown) that converts pixel data into data signals according to the data control signal and respectively supplies the data signals to the plurality of data lines.

The touch driver 600 may be driven in a touch mode or a haptic mode according to mode control by the controller 400.

In the touch mode, the touch driver 600 may sequentially supply a touch driving pulse TDP to the plurality of transmission lines Tx1 to Txn, may sense a capacitance change of a touch sensor Cm based on a user touch applied to the touch panel 300 through the plurality of reception lines Rx1 to Rxm to generate the touch sensing data Dtouch, and may supply the touch sensing data Dtouch to the controller 400.

In the haptic mode, the touch driver 600 may generate a haptic basic waveform and a haptic signal HS combined with a carrier waveform, based on the touch area data TAD and the haptic object data HOD which are supplied from the controller 400, may select at least one transmission line included in the user touch area from among the plurality of transmission lines Tx1 to Txn, and may supply the haptic signal HS to the selected transmission line. Therefore, an attractive force may be generated in the user touch area according to the haptic signal HS supplied through a corresponding transmission line, and thus, a user may feel a tactile sense.

The touch driver 600 according to an embodiment may include a timing generating unit 610, a driving pulse supplying unit 620, a haptic driving unit 630, a channel selecting unit 640, a sensing unit 650, and a touch data processing unit 660. The touch driving unit 600 including the elements may be integrated into one readout integrated circuit (ROIC) chip. However, the touch data processing unit 660 may not be integrated into the ROIC chip but may be built into the controller 400.

The timing generating unit 610 may generate a touch timing signal and a channel selection signal CSS for touch sensing driving of the touch driver 600 in response to a mode signal MS based on the touch mode supplied from the controller 400. Also, the timing generating unit 610 may generate a haptic timing signal for haptic driving of the touch driver 600 and generate the channel selection signal CSS corresponding to the touch area data TAD supplied from the controller 400, in response to the mode signal based on the haptic mode supplied from the controller 400

The driving pulse supplying unit 620 may generate a touch driving pulse TDP in response to the touch timing signal supplied from the timing generating unit 610 and may sequentially supply the generated touch driving pulse TDP to the plurality of transmission lines Tx1 to Txn through the channel selecting unit 640. Here, the touch driving pulse TDP may include a plurality of pulses so as to increase a charging amount of the touch sensor Cm and thus enhance sensing sensitivity.

The haptic driving unit 630 may generate the haptic basic waveform and the haptic signal HS combined with a carrier waveform, based on the haptic object data HOD supplied from the controller 400 and may supply the haptic signal HS to at least one transmission line, included in a touch area corresponding to the touch area data TAD supplied from the controller 400, among the plurality of transmission lines Tx1 to Txn. The haptic driving unit 630 may include a haptic signal setting unit 631, a haptic signal generating unit 633, and a memory 635.

The memory 635 may store setting information of a haptic signal which includes haptic basic waveform information corresponding to a haptic basic waveform of each of various haptic object samples, a haptic voltage level of a haptic basic waveform, and frequency information of a carrier waveform combined with the haptic basic waveform, which are set by the apparatus and method for modeling a haptic signal from a haptic object according to an embodiment of the present invention. The memory 635 may be provided inside the haptic driving unit 630 or may be provided inside or outside the touch driver 600.

The haptic signal setting unit 631 may extract setting information HSI of a haptic signal, corresponding to the haptic object data HOD supplied from the controller 400, from the setting information of the haptic signal stored in the memory 635 and may supply the extracted setting information HSI of the haptic signal to the haptic signal generating unit 633. That is, the haptic signal setting unit 631 may extract the setting information HSI of the haptic signal (i.e., haptic basic waveform information, a haptic voltage level, and frequency information of a carrier waveform), corresponding to the haptic object data HOD, from a first lookup table stored in the memory 635.

Figure 14A:
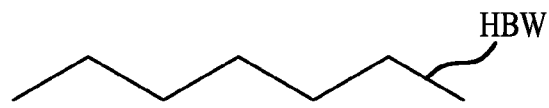
FIGS. 14A, 14B, 14C and 14D are waveform diagrams showing a haptic basic waveform, a carrier waveform, and a haptic signal according to an embodiment of the present invention.
Figure 14B:
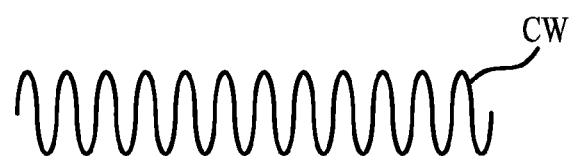

The haptic signal generating unit 633 may generate the haptic signal HS, based on the setting information HSI of the haptic signal (i.e., the haptic basic waveform information, the haptic voltage level, and the frequency information of the carrier waveform) supplied from the haptic signal setting unit 631. For example, the haptic signal generating unit 633 may generate a haptic basic waveform HBW shown in FIG. 14A, based on the haptic basic waveform information and the haptic voltage level, may generate a carrier waveform CW shown in FIG. 14B, based on the frequency information of the carrier waveform, and may combine the haptic basic waveform HBW with the carrier waveform CW to generate the haptic signal HS shown in FIG. 14C or 14D.

In generating the haptic basic waveform, the haptic signal generating unit 633 according to an embodiment may select, as a reference waveform, at least one waveform corresponding to the haptic basic waveform information from among a sine waveform, a triangular waveform, a square waveform, a pulse waveform, and a sawtooth waveform and may modulate the selected reference waveform to generate the haptic basic waveform HBW corresponding to the haptic basic waveform information.

Figure 14C:
Figure 14D:

In generating the haptic signal HS, the haptic signal generating unit 633 according to an embodiment may combine the haptic basic waveform with the carrier waveform CW through frequency modulation based on a frequency addition combination method to generate the haptic signal HS shown in FIG. 14C. The haptic signal generating unit 633 according to another embodiment may modulate amplitude of the carrier waveform according to the haptic basic waveform by using an amplitude modulation method to generate the haptic signal HS having a double side band as shown in FIG. 14D.

As a result, the haptic signal generating unit 633 may add a high-frequency carrier waveform CW, which is incapable of being recognized by the user, into a low-frequency haptic basic waveform HBW to generate the haptic signal HS, thereby enabling the user to feel a tactile sense having a shape and a texture of a haptic object when the user touches the touch panel.

The channel selecting unit 640 may be separately connected to each of the plurality of transmission lines Tx1 to Txn and may be connected to the driving pulse supplying unit 620 and the haptic driving unit 630, thereby connecting a transmission line Tx, corresponding to the channel selection signal CSS, to the driving pulse supplying unit 620 or the haptic driving unit 630. The channel selecting unit 640 may transfer the touch driving pulse TDP, supplied from the driving pulse supplying unit 620, to a transmission line Tx corresponding to the channel selection signal CSS based on the touch mode. Also, the channel selecting unit 640 may transfer the haptic signal HS, supplied from the haptic driving unit 630, to a transmission line Tx corresponding to the channel selection signal CSS based on the haptic mode. The channel selecting unit 640 may include a plurality of multiplexers.

The sensing unit 650 may be connected to each of the plurality of reception lines Rx1 to Rxm. In response to a sampling signal from the timing generating unit 610, the sensing unit 650 may sense a change amount of a capacitance of a corresponding touch sensor Cm through each of the plurality of reception lines Rx1 to Rxm and may analog-digital convert the generated sensing signal to generate the touch sensing data Dtouch.

The touch data processing unit 660 may receive the touch sensing data Dtouch input from the sensing unit 650 and may sequentially store the touch sensing data Dtouch in an internal memory. In response to a touch report signal from the timing generating unit 610, the touch data processing unit 660 may transfer the touch sensing data Dtouch, stored in the internal memory, to the controller 400.

The controller 400 may receive the touch sensing data Dtouch transferred from the touch data processing unit 660 and may compare the received touch sensing data Dtouch with a predetermined threshold value to determine whether there is a touch and calculate touch coordinates by using sensing data greater than the threshold value. Also, the controller 400 may calculate the touch coordinates (XY coordinates), based on position information (Y coordinates) of the touch sensing electrode 314 from which the touch sensing data Dtouch is generated and position information (X coordinates) of the touch driving electrode 312 which is being driven and may execute an application program associated with the touch coordinates. Also, the controller 400 may generate the touch area data TAD corresponding to the calculated touch coordinates and may supply the touch area data TAD to the touch driver 600.

The display apparatus according to the first embodiment of the present invention may generate a haptic signal having a shape and a texture of a haptic object corresponding to a user touch area to generate an attractive force in the user touch area, based on setting information of a haptic signal which is previously set by the method of modeling a haptic signal from a haptic object and is stored in a memory, thereby providing a finger of a user with a tactile sense having the same shape and texture as those of the haptic object.

A display apparatus according to a second embodiment of the present invention may include a capacitive touch panel disclosed in U.S. Patent Publication No. 2014-0062933 or a touch panel disclosed in Korean Patent Application No. 2014-0076794, instead of the above-described touch panel 300. In this case, the display apparatus according to the second embodiment of the present invention may sense a touch force as well as a touch position when a user touches the touch panel.

The display apparatus according to the second embodiment of the present invention may calculate touch area data TAD corresponding to a user touch area, based on touch sensing data supplied from the touch driver 600 and may calculate touch force data, based on touch force sensing data supplied from the touch driver 600. Also, the controller 400 may extract haptic object data HOD from image source data "$S_{Image}$", based on the touch area data TAD.

Figure 15:
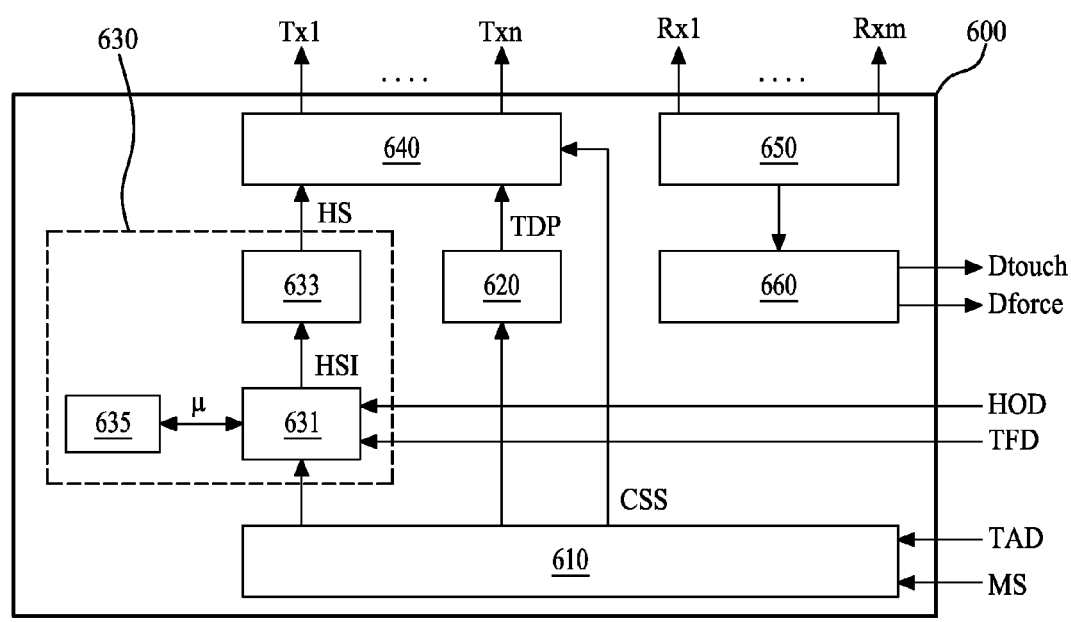
FIG. 15 is a diagram describing a touch driver of a display apparatus according to a second embodiment of the present invention.

In the display apparatus according to the second embodiment of the present invention, as illustrated in FIG. 15, a touch driver 600 may include a timing generating unit 610, a driving pulse supplying unit 620, a haptic driving unit 630, a channel selecting unit 640, a sensing unit 650, and a touch data processing unit 660. The elements other than the haptic driving unit 630 and the sensing unit 650 are as described above, and thus, their detailed descriptions are not repeated.

The sensing unit 650 may sense a change amount of a capacitance of a corresponding touch sensor Cm through each of the plurality of reception lines Rx1 to Rxm and may analog-digital convert the generated sensing signal to generate touch sensing data Dtouch. Also, the sensing unit 650 may sense a user touch force applied to the touch panel 300 through a force sensing line to generate touch force sensing data Dforce and may supply the touch force sensing data Dforce to the controller 400. A touch force sensing operation performed by the sensing unit 650 is disclosed in U.S. Patent Publication No. 2014-0062933 or a touch panel disclosed in Korean Patent Application No. 2014-0076794, and thus, its detailed description is not provided.

The haptic driving unit 630 may generate a haptic signal HS, based on haptic object data HOD and touch force data TFD supplied from the controller 400 and may supply the generated haptic signal HS to a transmission line included in the user touch area. To this end, the haptic driving unit 630 may include a haptic signal setting unit 631, a haptic signal generating unit 633, and a memory 635.

The above-described second to fourth lookup tables may be stored in the memory 635. That is, the memory 635 may store the second lookup table where haptic basic waveform information and a friction coefficient for each of various haptic object samples set by the apparatus and method for modeling a haptic signal from a haptic object according to an embodiment of the present invention are mapped, the third lookup table where a correlation between friction forces of the haptic object sample 10 based on voltage levels is mapped, and the fourth lookup table where a correlation between friction forces of the haptic object sample 10 based on frequencies of carrier waveforms is mapped.

The haptic signal setting unit 631 may extract haptic basic waveform information and a friction coefficient "μ", corresponding to the haptic object data HOD, from the second lookup table stored in the memory 635. Subsequently, the haptic signal setting unit 631 may set the touch force data TFD, supplied from the controller 400, as a vertical drag value and may multiply the vertical drag value with the extracted friction coefficient "μ" to calculate a friction force of a haptic object. Subsequently, the haptic signal setting unit 631 may extract a haptic voltage level and frequency information of a carrier waveform, corresponding to the friction force of the haptic object, from the third and fourth lookup tables stored in the memory 635. Subsequently, the haptic signal setting unit 631 may supply, to the haptic signal generating unit 633, setting information HIS of a haptic signal which includes the extracted haptic basic waveform information, haptic voltage level and frequency information of the carrier waveform.

The haptic signal generating unit 633 may generate the haptic signal HS, based on the setting information HSI of the haptic signal (i.e., the haptic basic waveform information, the haptic voltage level, and the frequency information of the carrier waveform) supplied from the haptic signal setting unit 631.

The display apparatus according to the second embodiment of the present invention provides the same effects as those of the display apparatus according to the first embodiment of the present invention.

Figure 16:
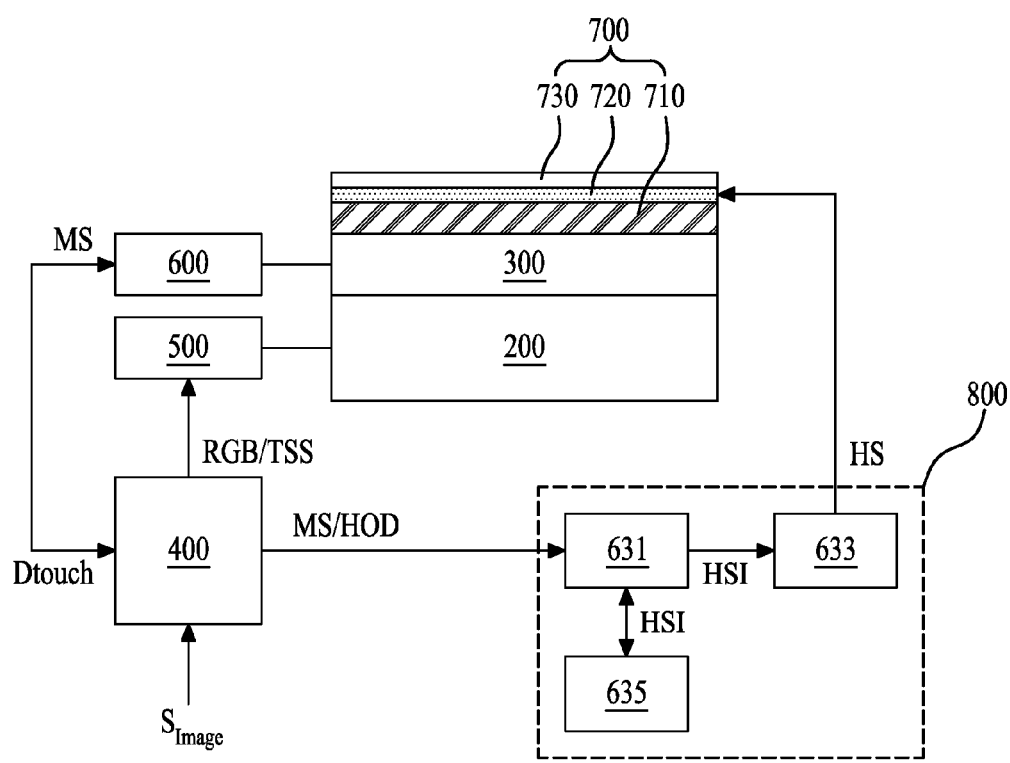
FIG. 16 is a diagram describing a display apparatus according to a third embodiment of the present invention.

FIG. 16 is a diagram describing a display apparatus according to a third embodiment of the present invention.

Referring to FIG. 16, the display apparatus according to the third embodiment of the present invention may include a display panel 200, a touch panel 300, a controller 400, a display driver 500, a touch driver 600, a haptic panel 700, and a haptic driver 800.

The display panel 200, the touch panel 300, and the display driver 500 are as described above, and thus, their detailed descriptions are not repeated.

The haptic panel 700 may be disposed on the touch panel 300 and may generate an attractive force in a user touch area to provide tactility to a finger of a user. The haptic panel 700 according to an embodiment may include a transparent base substrate 710, a haptic electrode layer 720 provided on the transparent base substrate 710, and a protective film 730 covering the haptic electrode layer 720.

The haptic electrode layer 720 according to an embodiment may be provided all over a top of the transparent base substrate 710. The haptic electrode layer 720 according to another embodiment may include a plurality of first haptic electrode patterns (not shown), which are arranged at certain intervals along a direction parallel to a transmission line of the touch panel 300, and a plurality of second haptic electrode patterns (not shown) which are arranged at certain intervals along a direction parallel to a reception line of the touch panel 300.

The protective film 730 may act as an insulator that covers the haptic electrode layer 720.

The controller 400 is as described above except that the controller 400 supplies the haptic driver 800 with a mode signal MS and haptic object data HOD based on the haptic mode, and thus, its detailed description is not repeated.

In response to the mode signal based on the touch mode supplied from the controller 400, the touch driver 600 may sequentially supply a touch driving pulse TDP to the plurality of transmission lines Tx1 to Txn and may sense, through the plurality of reception lines Rx1 to Rxm, a capacitance change of a touch sensor Cm based on a user touch applied to the touch panel 300 to supply touch sensing data Dtouch to the controller 400. The touch driver 600 according to an embodiment may include a timing generating unit 610, a driving pulse supplying unit 620, a sensing unit 650, and a touch data processing unit 660 among the elements illustrated in FIG. 13.

The timing generating unit 610 may generate a touch timing signal for touch sensing driving of the touch driver 600 in response to the mode signal MS based on the touch mode supplied from the controller 400.

In response to the touch timing signal supplied from the timing generating unit 610, the driving pulse supplying unit 620 may generate a touch driving pulse TDP and may sequentially supply the generated touch driving pulse TDP to the plurality of transmission lines Tx1 to Txn.

The sensing unit 650 may sense a change amount of a capacitance of a corresponding touch sensor Cm through each of the plurality of reception lines Rx1 to Rxm and may analog-digital convert the generated sensing signal to generate the touch sensing data Dtouch.

The touch data processing unit 660 may receive the touch sensing data Dtouch input from the sensing unit 650 and may sequentially store the touch sensing data Dtouch in an internal memory. In response to a touch report signal from the timing generating unit 610, the touch data processing unit 660 may transfer the touch sensing data Dtouch, stored in the internal memory, to the controller 400. Therefore, the controller 400 may receive the touch sensing data Dtouch transferred from the touch data processing unit 660, may calculate touch coordinates based on the received touch sensing data Dtouch, and may execute an application program associated with the touch coordinates.

The haptic driver 800 may generate a haptic signal HS, based on the haptic object data HOD supplied from the controller 400 and may supply the haptic signal HS to the haptic electrode layer 720 of the haptic panel 700. The haptic driver 630 according to an embodiment may include a haptic signal setting unit 631, a haptic signal generating unit 633, and a memory 635. The haptic driver 630 including the elements is as described above except that the haptic driver 630 supplies the haptic signal HS to the haptic electrode layer 720 of the haptic panel 700, and thus, its detailed description is not repeated.

The display apparatus according to the third embodiment of the present invention provides the same effects as those of the display apparatus according to the first embodiment of the present invention.

A display apparatus according to a fourth embodiment of the present invention may include elements other than the touch panel among the elements included in the display apparatus according to the third embodiment of the present invention and may include the capacitive touch panel disclosed in U.S. Patent Publication No. 2014-0062933 or a touch panel disclosed in Korean Patent Application No. 2014-0076794, instead of the touch panel. The display apparatus according to the fourth embodiment of the present invention may generate a haptic signal in the same method as the display apparatus according to the third embodiment of the present invention and may supply the generated haptic signal to the haptic electrode layer 720 of the haptic panel, thereby providing the same effects as those of the display apparatus according to the first embodiment of the present invention.

Figure 17A:
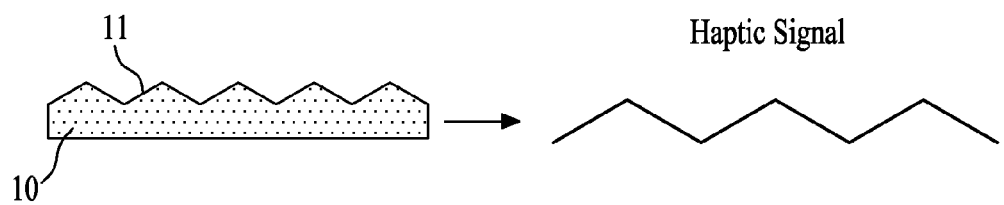
FIGS. 17A and 17B are diagrams describing a haptic signal according to an embodiment of the present invention.
Figure 17B:
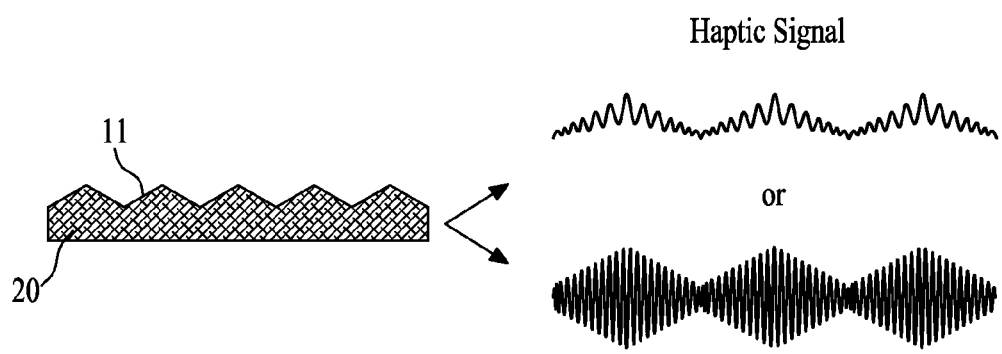

FIGS. 17A and 17B are diagrams describing a haptic signal according to an embodiment of the present invention. FIG. 17A shows a haptic signal corresponding to a haptic object causing a low friction force like plastic, and FIG. 17B shows a haptic signal corresponding to a haptic object causing a high friction force like rubbers.

As seen in FIGS. 17A and 17B, a haptic signal may be generated by combining a haptic basic waveform based on a shape of a haptic object with a carrier waveform based on a friction force caused by a material of the haptic object. Therefore, even when a haptic object includes the same texture objects 11, the haptic signal according to an embodiment of the present invention may have different shapes according to materials of the texture objects 11. Therefore, a haptic signal shown in FIG. 17A may provide a user with tactility corresponding to a shape of a texture object 11 provided in a haptic object 10. On the other hand, a haptic signal shown in FIG. 17B may simultaneously provide the user with tactility, corresponding to a shape of a texture object 11 provided in a haptic object 20, and tactility corresponding to a texture (or a friction force) of the texture object 11. As a result, the present invention may combine a high-frequency carrier waveform, which is incapable of being recognized by the user, into a low-frequency haptic basic waveform to generate a haptic signal, thereby enabling the user to feel a tactile sense having a shape and a texture of a haptic object.

Figure 18:
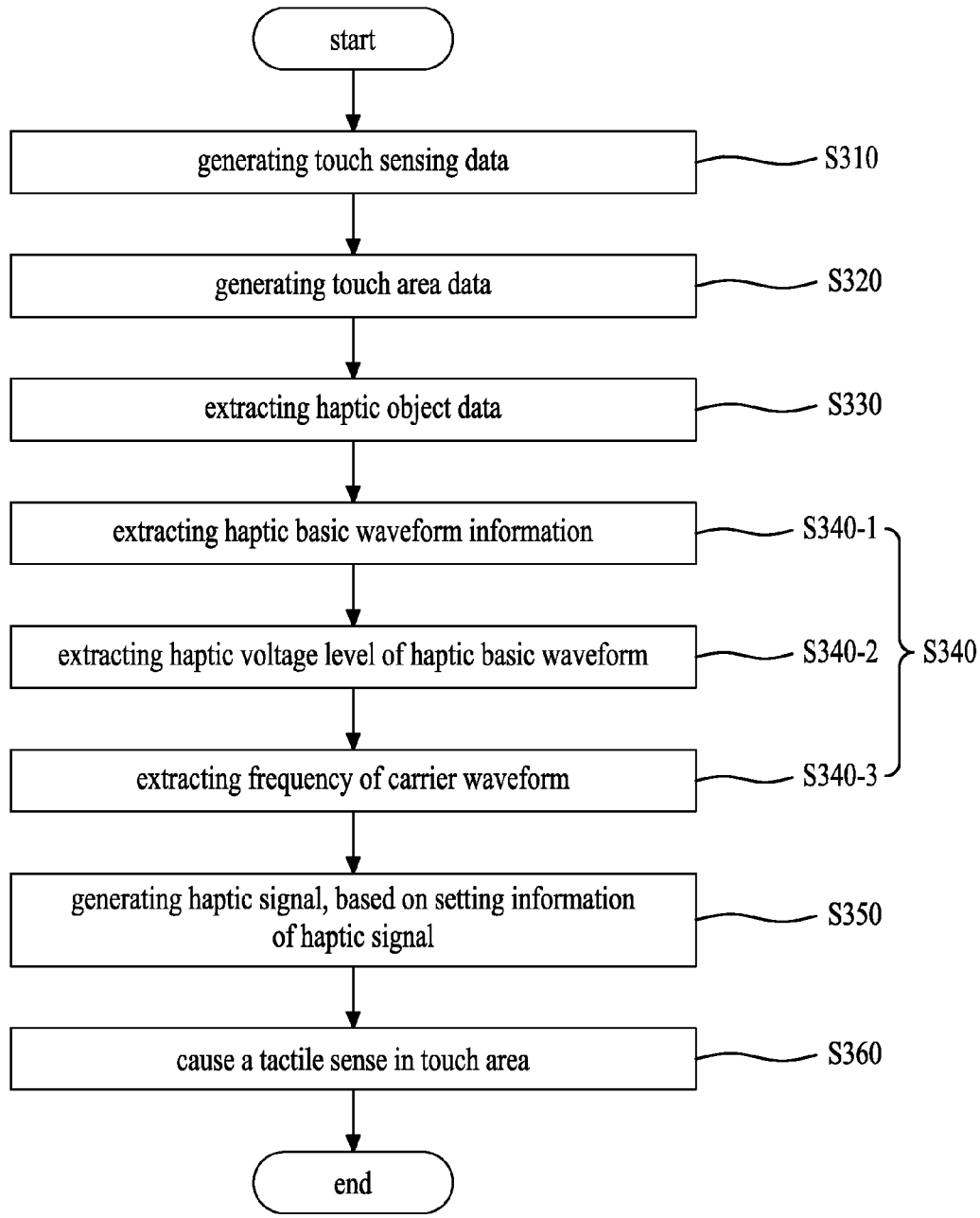
FIG. 18 is a flowchart describing a method of driving a display apparatus according to an embodiment of the present invention.

FIG. 18 is a flowchart for describing a method of driving a display apparatus according to an embodiment of the present invention and is for describing a haptic driving method performed by the display apparatus according to the first to third embodiments of the present invention.

The method of driving a display apparatus according to an embodiment of the present invention will now be described with reference to FIGS. 11 and 18.

First, in operation S310, touch sensing data Dtouch may be generated by sensing a user touch applied to the touch panel 300.

Subsequently, in operation S320, touch area data TAD corresponding to a user touch area may be calculated based on the touch sensing data Dtouch.

Subsequently, in operation S330, haptic object data HOD may be extracted from image source data "$S_{Image}$", based on the touch area data TAD. For example, haptic object data HOD of the user touch area corresponding to the touch area data TAD may be extracted from the haptic object data HOD included in frame-unit image source data "$S_{Image}$".

Subsequently, in operation S340, setting information of a haptic signal corresponding to the haptic object data HOD may be extracted from setting information of a haptic signal stored in the memory 635. For example, operation S340 may include operation S340-1 of extracting haptic basic waveform information corresponding to the haptic object data HOD from the first lookup table stored in the memory 635, operation S340-2 of extracting a haptic voltage level from the first lookup table, and operation S340-3 of extracting frequency information of a carrier waveform from the first lookup table.

Subsequently, in operation S350, a haptic signal HS may be generated based on the setting information HSI of the haptic signal (i.e., haptic basic waveform information, a haptic voltage level, and frequency information of a carrier waveform). For example, operation S350 may include: an operation of generating the haptic basic waveform HBW shown in FIG. 14A, based on the haptic basic waveform information and the haptic voltage level; an operation of generating the carrier waveform CW shown in FIG. 14B, based on the frequency information and the carrier waveform; and an operation of combining the haptic basic waveform HBW with the carrier waveform CW to generate the haptic signal shown in FIG. 14C or 14D.

Subsequently, in operation S360, the haptic signal HS may be supplied to the transmission line of the touch panel 300 included in the user touch area to generate an attractive force in the user touch area, thereby providing the user with a tactile sense having a shape and a texture of the haptic object. In operation S360, as illustrated in FIG. 16, the haptic signal HS may be supplied to the haptic electrode layer 720 of the haptic panel 700 provided on the touch panel 300.

The method of driving the display apparatus according to an embodiment of the present invention may generate the haptic signal HS having a shape and a texture of the haptic object data HOD set in the user touch area to generate an attractive force in the user touch area, based on the setting information HIS of the haptic signal which is previously set by the method of modeling a haptic signal from a haptic object and is stored in a memory, thereby providing a finger of the user with a tactile sense having the same shape and texture as those of the haptic object data HOD.

Figure 19:
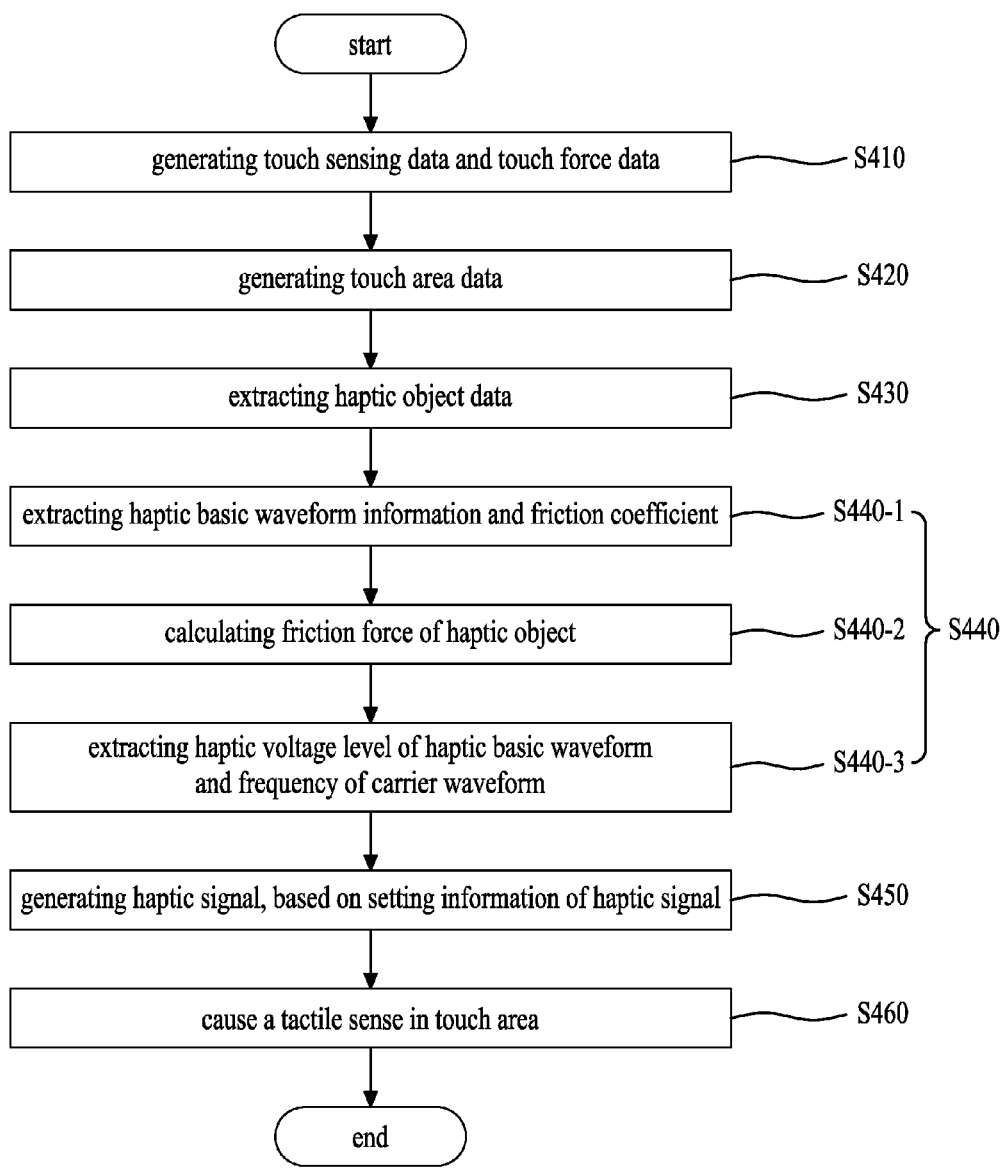
FIG. 19 is a flowchart describing a method of driving a display apparatus according to another embodiment of the present invention.

FIG. 19 is a flowchart for describing a method of driving a display apparatus according to another embodiment of the present invention and is for describing a haptic driving method performed by the display apparatus according to the second and fourth embodiments of the present invention.

The method of driving a display apparatus according to another embodiment of the present invention will now be described with reference to FIGS. 15 and 19.

First, in operation S410, touch sensing data Dtouch may be generated by sensing a user touch applied to the touch panel 300, and touch force sensing data Dforce may be generated by sensing a user touch force based on the user touch.

Subsequently, in operation S420, touch area data TAD corresponding to a user touch area may be calculated based on the touch sensing data Dtouch.

Subsequently, in operation S430, haptic object data HOD may be extracted from image source data "$S_{Image}$", based on the touch area data TAD. For example, haptic object data HOD of the user touch area corresponding to the touch area data TAD may be extracted from the haptic object data HOD included in frame-unit image source data "$S_{Image}$".

Subsequently, in operation S440, setting information of a haptic signal corresponding to the haptic object data HOD may be extracted from setting information of a haptic signal stored in the memory 635. For example, operation S440 may include: operation S440-1 of extracting a friction coefficient "μ" and haptic basic waveform information, corresponding to the haptic object data HOD, from the second lookup table stored in the memory 635; operation S440-2 of setting the touch force data TFD as a vertical drag value and multiplying the vertical drag value and the extracted friction coefficient "μ" to calculate a friction force of a haptic object; and operation S440-3 of extracting a haptic voltage level, corresponding to the friction force of the haptic object, from the third lookup table stored in the memory 635 and extracting frequency information of a carrier waveform, corresponding to the friction force of the haptic object, from the fourth lookup table stored in the memory 635.

Subsequently, in operation S450, a haptic signal HS may be generated based on the setting information HSI of the haptic signal (i.e., haptic basic waveform information, a haptic voltage level, and frequency information of a carrier waveform). For example, operation S450 may include: an operation of generating the haptic basic waveform HBW shown in FIG. 14A, based on the haptic basic waveform information and the haptic voltage level; an operation of generating the carrier waveform CW shown in FIG. 14B, based on the frequency information and the carrier waveform; and an operation of combining the haptic basic waveform HBW with the carrier waveform CW to generate the haptic signal shown in FIG. 14C or 14D.

Subsequently, in operation S460, the haptic signal HS may be supplied to the transmission line of the touch panel 300 included in the user touch area to generate an attractive force in the user touch area, thereby providing the user with a tactile sense having a shape and a texture of the haptic object. In operation S460, as illustrated in FIG. 16, the haptic signal HS may be supplied to the haptic electrode layer 720 of the haptic panel 700 provided on the touch panel 300.

The method of driving the display apparatus according to another embodiment of the present invention provides the same effects as those of the method of driving the display apparatus according to an embodiment of the present invention.

The display apparatus according to the embodiments of the present invention may be applied to a display unit of each of portable information devices, such as smartphones, tablet PCs, etc., and various electronic devices such as notebook computers, monitors, TVs, etc., which include a touch panel and a haptic function.

As described above, according to the embodiments of the present invention, the method of modeling a haptic signal from a haptic object according to the embodiments of the present invention may model setting information of a haptic signal for simultaneously realizing a shape and a texture of a haptic object sample.

Moreover, according to the embodiments of the present invention, the display apparatus and the driving method thereof according to the embodiments of the present may generate a haptic signal having a shape and a texture of a haptic object corresponding to a user touch area to cause an attractive force in the user touch area, thereby providing a user with a tactile sense having the same shape and texture as those of the haptic object.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed:

1. A display apparatus comprising:
a display panel including a plurality of pixels;
a display driver driving the plurality of pixels;
a touch panel disposed on the display panel, the touch panel including a plurality of transmission lines and a plurality of reception lines;
a touch driver sensing a capacitance change of each of the plurality of reception lines to generate touch sensing data and sensing touch force sensing data in a touch mode and in a haptic mode, generating a haptic signal to supply the haptic signal to at least one transmission line; and
a controller generating image data based on image source data input thereto to supply the image data to the display driver, calculating a touch area based on the touch sensing data, and extracting haptic object data of a haptic object, corresponding to the touch area, from among pieces of haptic object data included in the image source data, and calculating touch force data based on the touch force sensing data supplied from the touch driver,
wherein in the haptic mode, the touch driver generates the haptic signal that includes a carrier waveform and a haptic basic waveform corresponding to the haptic object data of the haptic object and the touch force data, and
wherein a frequency of the carrier waveform is determined based on force measurement data corresponding to a level of pressure applied to the haptic object.

2. The display apparatus of claim 1, wherein the touch driver comprises:
a memory storing haptic basic waveform information and a haptic voltage level, which correspond to the haptic basic waveform, and frequency information of the carrier waveform; and
a haptic driving unit generating the haptic basic waveform based on the haptic basic waveform information and the haptic voltage level, generating the carrier waveform based on the frequency information of the carrier waveform, and combining the haptic basic waveform with the carrier waveform to generate the haptic signal.

3. The display apparatus of claim 1, wherein
the touch driver comprises:
a memory storing haptic basic waveform information corresponding to the haptic basic waveform, a friction coefficient of the haptic object, a friction force of the haptic object based on a voltage level, and a friction force based on a frequency of a carrier waveform;

a sensing unit sensing the capacitance change of each of the plurality of reception lines to generate the touch sensing data and the touch force sensing data; and a haptic driving unit generating the haptic signal to supply the haptic signal to the at least one transmission line, and the haptic driving unit comprises:

a haptic signal setting unit calculating the friction force of the haptic object, based on the touch force data and extracting, from the memory, the haptic basic waveform information, a haptic voltage level corresponding to the calculated friction force of the haptic object, and frequency information of a carrier waveform; and a haptic signal generating unit generating the haptic basic waveform based on the extracted haptic basic waveform information and haptic voltage level, generating the carrier waveform based on the frequency information of the carrier waveform, and combining the haptic basic waveform with the carrier waveform to generate the haptic signal.

4. The display apparatus of claim 1, wherein a frequency of the carrier waveform is in a range of 1 kHz to 500 kHz.

5. A display apparatus comprising:

a display panel including a plurality of pixels;

a display driver driving the plurality of pixels;

a touch panel disposed on the display panel, the touch panel including a plurality of transmission lines and a plurality of reception lines;

a haptic panel disposed on the touch panel, the haptic panel including a haptic electrode layer;

a touch driver sensing a capacitance change of each of the plurality of reception lines to generate touch sensing data and sensing touch force sensing data;

a haptic driver generating a haptic signal to supply the haptic signal to the haptic electrode layer; and a controller generating image data based on image source data input thereto to supply the image data to the display driver, calculating a touch area based on the touch sensing data, and extracting haptic object data of a haptic object, corresponding to the touch area, from among pieces of haptic object data included in the image source data, and calculating touch force data based on the touch force sensing data supplied from the touch driver, wherein the haptic driver generates the haptic signal that includes a carrier waveform and a haptic basic waveform corresponding to haptic object data of the haptic object and the touch force data, and supplies the haptic signal to the haptic electrode layer.

6. The display apparatus of claim 5, wherein the haptic driver comprises:

a memory storing haptic basic waveform information and a haptic voltage level, which correspond to the haptic basic waveform, and frequency information of the carrier waveform; and a haptic signal generating unit generating the haptic basic waveform based on the haptic basic waveform information and the haptic voltage level, generating the carrier waveform based on the frequency information of the carrier waveform, and combining the haptic basic waveform with the carrier waveform to generate the haptic signal.

7. The display apparatus of claim 5, wherein the touch driver comprises a sensing unit sensing the capacitance change of each of the plurality of reception lines to generate the touch sensing data and the touch force sensing data, and the haptic driver comprises:

a memory storing haptic basic waveform information corresponding to the haptic basic waveform, a friction coefficient of the haptic object, a friction force of the haptic object based on a voltage level, and a friction force based on a frequency of a carrier waveform;

a haptic signal setting unit calculating the friction force of the haptic object, based on the touch force data and extracting, from the memory, the haptic basic waveform information, a haptic voltage level corresponding to the calculated friction force of the haptic object, and frequency information of a carrier waveform; and a haptic signal generating unit generating the haptic basic waveform based on the extracted haptic basic waveform information and haptic voltage level, generating the carrier waveform based on the frequency information of the carrier waveform, and combining the haptic basic waveform with the carrier waveform to generate the haptic signal.

8. A method of driving a display apparatus, the method comprising:

sensing a user touch applied to a touch panel to generate touch sensing data and touch force sensing data;

calculating a touch area, based on the touch sensing data, and calculating touch force data based on the touch force sensing data supplied from the touch driver;

extracting haptic object data of a haptic object, corresponding to the touch area, from among pieces of haptic object data included in input image source data;

generating a haptic signal that includes a carrier waveform and a haptic basic waveform corresponding to haptic object data of the haptic object and the touch force data; and causing a tactile sense in the touch area by using the haptic signal, wherein a frequency of the carrier waveform is determined based on force measurement data corresponding to a level of pressure applied to the haptic object.

9. The method of claim 8, wherein the generating of the haptic signal comprises:

extracting, from a memory, haptic basic waveform information and a haptic voltage level, which correspond to the haptic object data of the haptic object, and frequency information of the carrier waveform;

generating the haptic basic waveform, based on the haptic basic waveform information and the haptic voltage level;

generating the carrier waveform, based on the frequency information of the carrier waveform; and combining the haptic basic waveform with the carrier waveform to generate the haptic signal.

10. The method of claim 8, wherein the generating of the haptic signal comprises:

extracting a friction coefficient corresponding to the haptic object data of the haptic object from a memory to calculate a friction force of the haptic object, based on the touch force data and the friction coefficient;

extracting, from the memory, haptic basic waveform information corresponding to the haptic object data of the haptic object, a haptic voltage level corresponding to the friction force of the haptic object, and frequency information of the carrier waveform;

generating the haptic basic waveform, based on the extracted haptic basic waveform information and haptic voltage level;

generating the carrier waveform, based on the frequency information of the carrier waveform; and combining the haptic basic waveform with the carrier waveform to generate the haptic signal.

11. The method of claim 8, wherein the haptic signal is supplied to at least one transmission line provided in the touch panel.

12. The method of claim 8, wherein the haptic signal is supplied to a haptic electrode layer included in a haptic panel disposed on the touch panel.

13. The method of claim 8, wherein a frequency of the carrier waveform is in a range of 1 kHz to 500 kHz.

* * * * *